(12) United States Patent
Adler et al.

(10) Patent No.: US 12,116,210 B2
(45) Date of Patent: Oct. 15, 2024

(54) SYSTEMS AND METHODS FOR MANUFACTURE OF CONTROLLED RELEASE OF AGRICULTURAL CORES

(71) Applicant: E. I. DUPONT DE NEMOURS AND COMPANY, Wilmington, DE (US)

(72) Inventors: Scott A Adler, Green Bay, WI (US); Marios Avgousti, Kennett Square, PA (US); Robert Ray Burch, Exton, PA (US); Rajeev L Gorowara, Wilmington, DE (US); Robert Alan Lewis, Bear, DE (US); Charles A Sample, Porterfield, WI (US); Larry D Wierschke, Green Bay, WI (US); Jihua Zhang, Garnet Valley, PA (US)

(73) Assignee: Corteva Agriscience LLC, Indianapolis, IN (US)

( * ) Notice: Subject to any disclaimer, the term of this patent is extended or adjusted under 35 U.S.C. 154(b) by 593 days.

(21) Appl. No.: 17/286,250

(22) PCT Filed: Oct. 25, 2019

(86) PCT No.: PCT/US2019/058112
§ 371 (c)(1),
(2) Date: Apr. 16, 2021

(87) PCT Pub. No.: WO2020/092163
PCT Pub. Date: May 7, 2020

(65) Prior Publication Data
US 2021/0354929 A1 Nov. 18, 2021

Related U.S. Application Data

(60) Provisional application No. 62/829,448, filed on Apr. 4, 2019, provisional application No. 62/754,341, filed on Nov. 1, 2018.

(51) Int. Cl.
*B65G 21/20* (2006.01)
*A01C 21/00* (2006.01)
*C05G 5/35* (2020.01)

(52) U.S. Cl.
CPC .......... *B65G 21/2036* (2013.01); *A01C 21/00* (2013.01); *C05G 5/35* (2020.02)

(58) Field of Classification Search
None
See application file for complete search history.

(56) References Cited

U.S. PATENT DOCUMENTS 1,871,089 A * 8/1932 Shafer ................. A23G 3/2076
118/316
2,661,955 A 12/1953 Sherer
(Continued)

FOREIGN PATENT DOCUMENTS

CA 1111277 10/1981
CA 2479614 11/2011
(Continued)

OTHER PUBLICATIONS

International Search Report and Written Opinion for PCT/US19/558112 mailed Feb. 25, 2020.
(Continued)

*Primary Examiner* — Kavel Singh

(57) ABSTRACT

Carriers are disclosed for supporting a plurality of agricultural cores on a plurality of core supports for coating by a flexible film. The plurality of core supports may include a pedestal for supporting a respective agricultural core and a core periphery region having a plurality of bridge elements which couple the pedestal to the connecting structure between the plurality of core supports. The carriers may include a vacuum system that independently communicates a partial vacuum to an aperture in each respective pedestal (Continued)

and a plurality of apertures in the core periphery region of a respective core support between the bridge elements.

18 Claims, 31 Drawing Sheets

(56) References Cited

U.S. PATENT DOCUMENTS

| | | | |
|---|---|---|---|
| 3,060,873 | A | 10/1962 | Powers |
| 4,280,419 | A | 7/1981 | Fischer |
| 4,693,122 | A | 9/1987 | Griffith |
| 4,779,765 | A | 10/1988 | Neumeyer |
| 4,980,106 | A | 12/1990 | Vogel |
| 5,004,614 | A | 4/1991 | Staniforth |
| 5,089,041 | A | 2/1992 | Thompson et al. |
| 5,174,804 | A | 12/1992 | Rehberg et al. |
| 5,176,734 | A | 1/1993 | Fujita et al. |
| 5,186,732 | A | 2/1993 | Thompson et al. |
| 5,188,654 | A | 2/1993 | Manalastas et al. |
| 5,466,274 | A | 11/1995 | Hudson et al. |
| 5,645,624 | A | 7/1997 | Naka et al. |
| 5,993,505 | A | 11/1999 | Tijsma et al. |
| 6,139,597 | A | 10/2000 | Tijsma et al. |
| 6,287,359 | B1 | 9/2001 | Erhardt et al. |
| 6,329,319 | B1 | 12/2001 | Puglisi et al. |
| 6,336,949 | B1 | 1/2002 | Patra et al. |
| 6,412,392 | B1 | 7/2002 | Günter et al. |
| 6,500,223 | B1 | 12/2002 | Sakai et al. |
| 6,900,162 | B2 | 5/2005 | Wertz et al. |
| 6,903,053 | B2 | 6/2005 | Noda et al. |
| 7,617,784 | B2 | 11/2009 | Friggstad |
| 7,771,505 | B2 | 8/2010 | Ogle et al. |
| 7,862,642 | B2 | 1/2011 | Phillips |
| 7,931,729 | B2 | 4/2011 | Santosh |
| 8,025,709 | B2 | 9/2011 | Sanders et al. |
| 8,163,672 | B2 | 4/2012 | Birthisel |
| 8,211,201 | B2 | 7/2012 | Yadav |
| 8,322,293 | B2 | 12/2012 | Wollenhaupt et al. |
| 8,336,469 | B2 | 12/2012 | Preheim et al. |
| 8,371,240 | B2 | 2/2013 | Wollenhaupt et al. |
| 8,651,033 | B2 | 2/2014 | Wollenhaupt et al. |
| 8,741,240 | B2 | 6/2014 | Ogle et al. |
| 8,904,704 | B1 | 12/2014 | Madigan et al. |
| 9,029,636 | B2 | 5/2015 | Wu et al. |
| 9,078,393 | B1 | 7/2015 | Polizotto |
| 9,156,745 | B2 | 10/2015 | Hargrove et al. |
| 9,266,787 | B2 | 2/2016 | Pursell et al. |
| 9,554,502 | B2 | 1/2017 | Madsen et al. |
| 2002/0094444 | A1 | 7/2002 | Nakata et al. |
| 2004/0020254 | A1 | 2/2004 | Wynnyk et al. |
| 2004/0077498 | A1 | 4/2004 | Lynch |
| 2005/0130841 | A1 | 6/2005 | Blount |
| 2006/0150489 | A1 | 7/2006 | Legro et al. |
| 2007/0072775 | A1 | 3/2007 | Van et al. |
| 2009/0120339 | A1 | 5/2009 | Detweiler et al. |
| 2009/0165515 | A1 | 7/2009 | Aoki et al. |
| 2011/0214466 | A1 | 9/2011 | Yadav |
| 2012/0090366 | A1 | 4/2012 | Pursell et al. |
| 2012/0111075 | A1 | 5/2012 | Hargrove et al. |
| 2013/0210624 | A1 | 8/2013 | Stringfellow et al. |
| 2013/0253011 | A1 | 9/2013 | Jung et al. |
| 2014/0179770 | A1 | 6/2014 | Zhang et al. |
| 2014/0208648 | A1 | 7/2014 | Cox |
| 2014/0259906 | A1 | 9/2014 | Shani et al. |
| 2014/0261115 | A1 | 9/2014 | Kowalchuk |
| 2015/0047402 | A1 | 2/2015 | Walker et al. |
| 2015/0218059 | A1 | 8/2015 | Yadav |
| 2016/0023961 | A1 | 1/2016 | Savinelli et al. |
| 2017/0305588 | A1 | 10/2017 | Schoenfellinger |
| 2018/0214834 | A1* | 8/2018 | Yadav ............. B01J 2/26 |
| 2019/0233345 | A1 | 8/2019 | Avgousti et al. |
| 2021/0186013 | A1 | 6/2021 | Avgousti et al. |

FOREIGN PATENT DOCUMENTS

| | | |
|---|---|---|
| CA | 2921145 A1 | 2/2014 |
| CN | 1369562 A | 9/2002 |
| CN | 101244966 A | 8/2008 |
| CN | 101244966 B | 6/2010 |
| CN | 101723752 A | 6/2010 |
| CN | 101597193 B | 10/2012 |
| CN | 101492327 B | 12/2012 |
| CN | 103387456 A | 11/2013 |
| CN | 102816010 B | 6/2014 |
| CN | 104291935 A | 1/2015 |
| CN | 104447076 A | 3/2015 |
| CN | 204310973 U | 5/2015 |
| CN | 104672025 A | 6/2015 |
| CN | 104812723 B | 7/2018 |
| EP | 0583160 B1 | 5/1997 |
| EP | 0 607 363 B1 | 8/1997 |
| EP | 1 795 071 A1 | 6/2007 |
| JP | H05201787 A | 8/1993 |
| JP | 4838928 B2 | 12/2011 |
| RU | 2088556 C1 | 8/1997 |
| WO | WO-9114663 A1 | 10/1991 |
| WO | WO-9217424 A1 | 10/1992 |
| WO | WO-9814414 A1 | 4/1998 |
| WO | WO-03082003 A2 | 10/2003 |
| WO | WO-2006133893 A2 | 12/2006 |
| WO | WO-2011133765 A1 | 10/2011 |
| WO | WO-2013090628 A1 | 6/2013 |
| WO | 2014031501 A1 | 2/2014 |
| WO | WO-2014028759 A1 | 2/2014 |
| WO | WO-2015048867 A1 | 4/2015 |
| WO | WO-2016007948 A1 | 1/2016 |
| WO | WO-2016099919 A1 | 6/2016 |
| WO | WO-2017165482 A1 | 9/2017 |

OTHER PUBLICATIONS

Chien S.H., et al., "Recent Developments of Fertilizer Production and Use to Improve Nutrient Efficiency and Minimize Environmental Impacts," Advances in Agronomy, Dec. 31, 2009, vol. 102, pp. 267-322.

Desnos T., et al., "Root Branching Responses to Phosphate And Nitrate," Current Opinion in Plant Biology, Elsevier, Amsterdam, NL, Nov. 19, 2007, vol. 11, No. 1, pp. 82-87, DOI:10.1016/J.PBI. 2007.10.003, ISSN 1369-5266, XP022441366.

Extended European Search Report for European Application No. 17771034.0, mailed Jan. 31, 2020, 13 Pages.

Extended European Search Report for European Application No. 18861128.9, mailed May 3, 2021, 6 Pages.

Extended European Search Report for European Application No. 19878824.2, mailed Sep. 13, 2022, 11 Pages.

International Preliminary Report on Patentability for International Application No. PCT/US2017/023524, mailed Oct. 4, 2018, 16 Pages.

International Preliminary Report on Patentability for International Application No. PCT/US2018/052672, mailed Apr. 9, 2020, 16 Pages.

International Preliminary Report on Patentability for International Application No. PCT/US2019/058112, mailed May 14, 2021, 8 Pages.

International Search Report and Written Opinion for International Application No. PCT/US2017/023524, mailed Aug. 23, 2017, 20 Pages.

International Search Report and Written Opinion for International Application No. PCT/US2018/052672, mailed Jan. 16, 2019, 20 Pages.

"Iowa State Soil: Tama Soil Series," Iowa State University, Extension and Outreach, Soil and Land Use, accessed on May 19, 2022, 1 page, Retrieved from URL: https://www.extension.iastate.edu/soils/iowa-state-soil-tama-soil-series.

Maharjan B., et al., "Polymer-Coated Urea Improved Corn Response Compared to Urea-Ammonium-Nitrate When Applied on a Coarse-Textured Soil," Agronomy, Soils & Environmental Quality, Mar. 4, 2016, vol. 108, No. 2, pp. 509-518.

(56) References Cited

OTHER PUBLICATIONS

Partial Supplementary European Search Report for European Application No. 17771034.0, mailed Oct. 25, 2019, 15 Pages.
Partial Supplementary European Search Report for European Application No. 19878824.2, mailed Jun. 13, 2022, 13 Pages.
Reicher Z., et al., "Maintaining Lawns on Sandy Soils," Purdue Turfgrass Science Program, Jul. 9, 2000, 2 Pages, [Retrieved on Feb. 18, 2021] Retrieved from URL: http://www.agry.purdue.edu/turf/pubs/agry9803.htm.
Savant N.K., et al., "Deep placement of Urea Supergranules in Transplanted Rice: Principles and Practices," Fertilizer Research, 1990, vol. 25, pp. 1-83.
Scher H.B., "Controlled-Release Delivery Systems for Pesticides," Marcel Dekker, Inc., 1999, p. 55-85, p. 89-136, p. 137-172, p. 173-193, 29 Pages.
Schreiner O., et al., "Determining the Fertilizer Requirements of Soils," US Department of Agriculture, Yearbook, 1938, 18 Pages.
Swenson S.J., et al., "Corn Earworms (Lepidoptera: Noctuidae) as Pests of Soybean," Journal of Integrated Pest Managment, 2013, vol. 4, No. 2, pp. 1-8.

\* cited by examiner

SYSTEMS AND METHODS FOR MANUFACTURE OF CONTROLLED RELEASE OF AGRICULTURAL CORES

FIELD

The present disclosure relates to systems and methods for coating agricultural cores and, in particular, to systems and methods for coating agricultural cores with flexible films.

BACKGROUND

It is known to coat a fertilizer pellet with film. However, a need exists for improved systems and methods for coating pellets with fertilizer and other agricultural compounds that can be run generally continuously, and especially in situations where there is less than a 100% core fill rate.

SUMMARY

Carriers are provided for supporting a plurality of agricultural cores on a plurality of core supports for coating by a flexible film. The plurality of core supports may include a pedestal for supporting a respective agricultural core and a core periphery region having a plurality of bridge elements which couple the pedestal to the connecting structure between the plurality of core supports. The carriers may include a vacuum system that independently communicates a partial vacuum to an aperture in each respective pedestal and a plurality of apertures in the core periphery region of a respective core support between the bridge elements.

In an exemplary embodiment of the present disclosure, a system is provided for coating agricultural cores with a flexible film. The system may comprise a carrier having an exterior face including a connecting structure and a plurality of core supports recessed relative to the connecting structure. Each core support may include a pedestal sized and shaped to support one of the agricultural cores to be coated. The pedestal may include an aperture of a first fluid conduit. A plurality of bridges may extend between the pedestal and the connecting structure of the exterior face of the carrier, and the plurality of bridges may be separated by a plurality of apertures of a second fluid conduit. A vacuum system may be in fluid communication with the first fluid conduit and the second fluid conduit. The plurality of bridges may connect the connecting structure and the pedestal such that when an agricultural core is not positioned on the pedestal the flexible film is capable of conforming to the shape of the pedestal, the plurality of bridges, and the connecting structure. A top surface of the pedestal may be below a top surface of the connecting structure. Each of the plurality of bridges may have a top surface extending above the top surface of the connecting structure, or each of the plurality of bridges may have a top surface positioned completely lower than the top surface of the connecting structure. The pedestal may include a concave section surrounded by an outer shelf. The concave section may include the aperture of the first fluid conduit. The carrier may include a base having a plurality of recesses and a plurality of inserts. Each of the plurality of inserts may be positioned in a respective one of the plurality of recesses. Each of the plurality of inserts may include the pedestal and bridges of the respective core supports. The system may utilize biodegradable film. The system may comprise a plurality of elongated film securing apertures.

In another exemplary embodiment of the present disclosure, a method of simultaneously coating a plurality of agricultural cores with a flexible film is provided. The method may comprise the steps of supporting a first integer number of the plurality of agricultural cores on a first carrier having an exterior face including a connecting structure and a second integer number of core supports recessed relative to the connecting structure, each core support may include a pedestal sized and shaped to support one of the agricultural cores to be coated and a plurality of bridges which may extend between the pedestal and the connecting structure of the exterior face, the second integer number being greater than the first integer number. The method involves positioning a flexible film over the first integer number of agricultural cores, coating an upper portion of each of the first integer number of agricultural cores with a first number of pieces of the flexible film broken off of the overall flexible sheet film, and conforming a remainder of the flexible sheet film to the pedestal and plurality of bridges of a third integer number of core supports of the carrier, the third integer number being equal to the first integer number subtracted from the second integer number. The flexible film may be treated to increase a formability of the flexible film, which treatment may include heating. Biodegradable film may be used. The upper portion of each of the first integer number of agricultural cores with the first number of pieces of the flexible sheet film broken off of the overall flexible sheet film may include the steps of applying a partial vacuum to a plurality of apertures positioned between the plurality of bridges of each core support and around a periphery of the first number of agricultural cores supported on each core support of the first number of core supports. The flexible sheet film may be stretched to a breaking point to separate the first number of pieces of the flexible sheet film from the overall sheet film. The step of conforming the remainder of the flexible sheet film to the pedestal and the plurality of bridges of the third integer number of core supports of the carrier may include the steps of applying a partial vacuum to a plurality of apertures positioned between the plurality of bridges of each core support of the third number of core supports and applying a partial vacuum to an aperture in the pedestal of each core support of the third number of core supports. The flexible film may be secured to a film support by a plurality of elongated film securing apertures. The film support may be at a different level, higher or lower, than the plate that holds the cores. The step of removing the remainder of the flexible film from the carrier subsequent to the first number of pieces of the flexible film being broken off of the overall flexible sheet film may include portions of the flexible film being positioned over the connecting structure and portions conformed to the pedestals and the plurality of bridges of the third integer number of core supports.

In another embodiment for a system for coating agricultural cores with a flexible film, the system may comprise a carrier having an exterior face including a connecting structure and a plurality of core supports recessed relative to the connecting structure. Each core support may include a central region to support the respective agricultural core. The central region may include an aperture of a first fluid conduit. A core periphery region may surround the respective agricultural core. The core periphery region may include a plurality of apertures of a second fluid conduit. A vacuum system may be in fluid communication with the first fluid conduit and the second fluid conduit. The vacuum system may control an application of a partial vacuum to the first fluid conduit independent of an application of a partial vacuum to the second fluid conduit. The vacuum system may permit the application of the partial vacuum to the second fluid conduit to stretch and break the flexible film. The vacuum system may permit the application of the partial vacuum to the first fluid conduit when the respective core support is positioned to receive an agricultural core. The flexible film may be secured to a film support by a plurality of elongated film securing apertures.

In another embodiment, a system for coating agricultural cores with a flexible film is provided. The system may comprise a carrier having a plurality of core supports connected by a connecting structure. A first film support may be positioned along a first side of the connecting structure, and a second film support may be position along a second side of the connecting structure, opposite the first side of the connecting structure. The first film support and the second film support may include a plurality of elongated film securing apertures. A vacuum system may be in fluid communication with the plurality of elongated film securing apertures in the first film support and the second film support. The vacuum system may control an application of a partial vacuum to the plurality of elongated film securing apertures to hold the flexible film relative to the carrier. The system may have a core support that includes a central region to support the respective agricultural core, and the central region may include an aperture of a first fluid conduit. The vacuum system may control an application of a partial vacuum to the first fluid conduit independent of the application of the partial vacuum to the plurality of elongated apertures in the first film support and the second film support. Each core support may include a core periphery region surrounding the central region, and the core periphery region may include a plurality of apertures of a second fluid conduit. The vacuum system may control an application of a partial vacuum to the second fluid conduit independent of the application of the partial vacuum to the first fluid conduit.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrate exemplary embodiments of the present disclosure and such exemplifications are not to be construed as limiting the scope of the present disclosure in any manner.

DETAILED DESCRIPTION OF THE DRAWINGS

Figure 1:
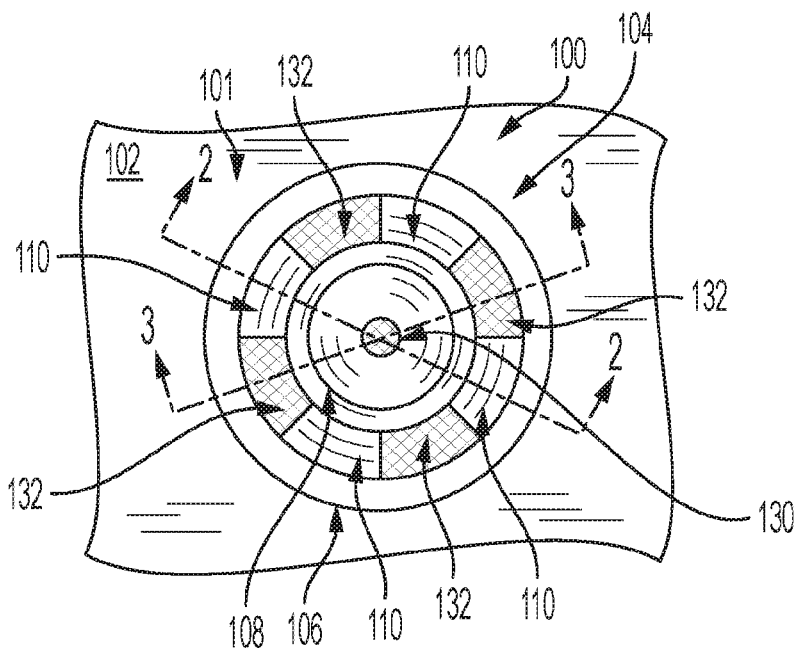
FIG. 1 illustrates a portion of an exemplary exterior face of a carrier for cores to be coated, the portion including a first cavity for receiving a first core to be coated.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other).

In some instances, throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 19A:
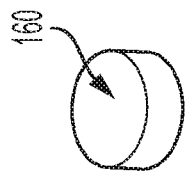
FIG. 19A illustrates an exemplary tablet shaped agricultural core.
Figure 19B:
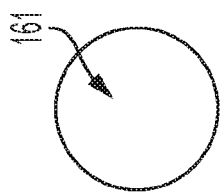
FIG. 19B illustrates an exemplary sphere shaped agricultural core.

Disclosed herein are various systems and methods for positioning agricultural cores or coating agricultural cores with a flexible film. Exemplary agricultural cores are illustrated in FIGS. 19A and 19B. In FIG. 19A, a tablet shaped agricultural core 160 is shown having a generally cylindrical shape. In embodiments, agricultural cores 160 may be about 7.5 millimeters in height. In FIG. 19B, a generally spherical shaped agricultural core 161 is shown. In embodiments, agricultural cores 161 may be about 9.5 millimeters in diameter, although size of the core may vary depending upon the agricultural application. In other embodiments, the size of the agricultural core is matched to the approximate size and shape of the seed with which it may be planted.

As used herein the terms "agricultural core" and "core", used interchangeably, mean a solid having one or more agriculturally beneficial substances which promote plant growth, promote desired plant characteristics, and/or reduce detrimental influence of the environment on a desired plant. Exemplary agriculturally beneficial substances include fertilizers, herbicides, insecticides, fungicides, plant growth regulators, surfactants, shelf-life extenders, micronutrients, macronutrients, liming materials, and inert ingredients, if any. Exemplary micronutrients include iron (Fe), boron (B), chlorine (CI), manganese (Mn), zinc (Zn), copper (Cu), molybdenum (Mo), nickel (Ni). Exemplary macronutrients include nitrogen (N), phosphorus (P), potassium (K), calcium (Ca), sulfur (S), magnesium (Mg), carbon (C), oxygen (O), and hydrogen (H).

In embodiments, flexible film 162 is a thermoformable flexible film. In embodiments, the softening temperature of the thermoformable flexible film is at least 10 degrees Celsius lower than the melting temperature of the core to be coated. In one embodiment, the softening temperature of the thermoformable flexible film is between about 60 degrees Celsius and 120 degrees Celsius. In embodiments, the flexible film includes multiple layers. In other embodiments, the flexible film is a single layer.

Exemplary flexible films include films including a single polymer such as polyethylene, polypropylene, polystyrene, polyethylene terephthalate, polyester, nylon, cellophane, polyacrylate, polyvinyl chloride, polyvinylidene chloride, polycarbonate, thermoplastic polyurethane, fully and partially hydrolyzed polyvinyl alcohol, ethylene-vinyl acetate copolymer, acrylonitrile-butadiene-styrene copolymer, biodegradable or compostable polymer such as polylactic acid, polybutylene succinate, polycaprolactone, polyhydroxyalkanoate, copolyester, cellulosic polymer, starch polymer. Further exemplary films include films composed of a blend of the polymers mentioned herein. Still further exemplary films include films composed of a single polymer or a blend of polymers and a filler that is known in the field to improve the performance of the film. Exemplary fillers include plasticizers, impact modifiers, mineral fillers, water-soluble fillers and pigments. Still further exemplary films include biodegradable films of a single component or a blend of components. Exemplary biodegradable films are films derived from renewable biomass sources, such as vegetable fats and oils, starch such as corn starch, plant based cellulose, lactic acid, straw, woodchips and/or food waste.

Figure 10:
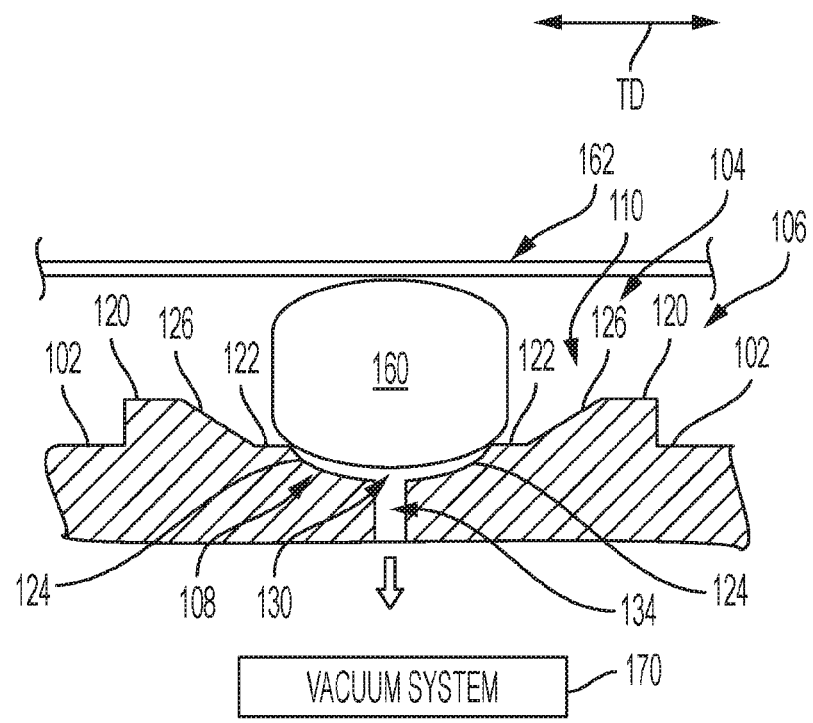
FIG. 10 illustrates the sectional view of FIG. 2 with a core supported on the pedestal and a flexible film positioned over the carrier including the cavity with the core supported on the pedestal.
Figure 17:
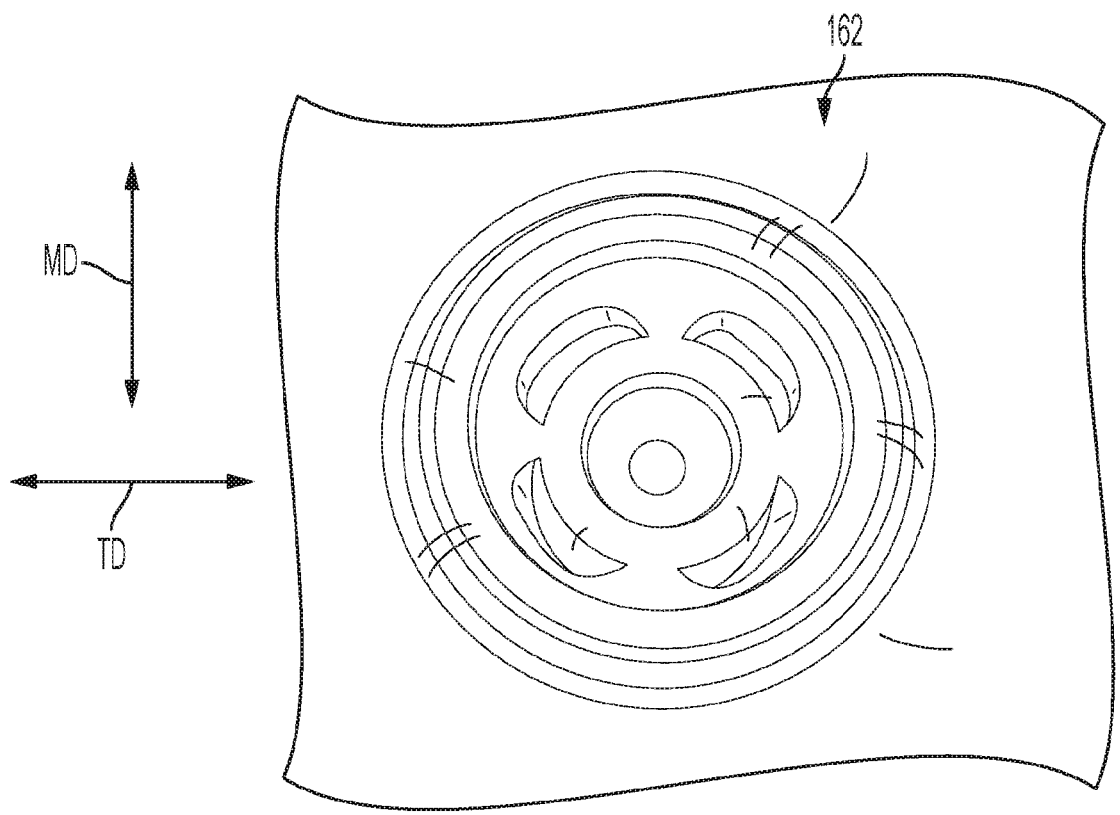
FIG. 17 illustrates a portion of the flexible film removed from the carrier, the portion of the flexible film corresponding to the portion of the carrier of FIG. 16 including the first cavity when a core is not present when a vacuum system reduces the pressure between the flexible film and the exterior surface of the carrier, the portion of flexible film shown is from a side opposite the exterior face of the carrier.

In embodiments, suitable exemplary films include films having a thermal shrinkage of less than about 5% at about 120° C. in both the machine direction (MD) (i.e., horizontal to the flow of the film, as shown in FIG. 17, and the transverse direction (TD) (i.e., parallel to the flow of the film), as shown in FIGS. 10 and 17, with or without annealing. Further, in embodiments, suitable exemplary films include films having an elongation at break (separation of film coating core from remainder of film) at about 120° C. of less than about 20-30% in both the MD and the TD. Further, in embodiments, suitable exemplary films include films having a difference in elongation at break between the MD and the TD resulting in a ratio between elongation at break in the MD and elongation at break in the TD of approximately 0.5 to 2, an impact strength greater than 0.1 ft·lb, 35 N·mm, or 0.1 Joules, and a permeability or water vaper transmission rate of 200-500 g/m²/day at 25° C. One example of a film exhibiting such characteristics includes a film comprising a blend of 10% polybutylene succinate and 90% polylactic acid which has been melt extruded to a 1 millimeter or less film in such a way that the shrinkage is less than 5% in both the TD and the MD. In various embodiments, the exemplary films may include approximately 2% or less of an additive such as clay. Additional exemplary films are provided in Table 1. For the films listed in Table 1, BIOMAX is DuPont BIOMAX Strong 100; PBSA grade is Mitsubishi FZ91PD; PLA 4032D is NATUREWORKS INGEO 4032D; and PLA 10361D is NATUREWORKS INGEO 10361D.

TABLE 1

| Composition | Thickness | MD Shrinkage | TD Shrinkage |
|---|---|---|---|
| 100 wt % PLA 4032D | 0.8 mil | 8-10% | 1-2% |
| 5 wt % BIOMAX + 95 wt % PLA 4032D | 1 mil | 4-5% | None |
| 10 wt % PBSA + 90 wt % PLA 4032D | 1 mil | 5-6% | None |
| 20 wt % PBSA + 80 wt % PLA 4032D | 1 mil | None | 4-5% |
| 2 wt % Kaolin + 9.8 wt % PBSA + 88.2 wt % PLA 4032D | 1 mil | 8-10% | 4-6% |
| 5 wt % Kaolin + 9.5 wt % PBSA + 85.5 wt % PLA 4032D | 1 mil | 5-6% | 1-2% |
| 2 wt % Talc + 9.8 wt % PBSA + 88.2 wt % PLA 4032D | 1 mil | 4-5% | 1-2% |
| 5 wt % Talc + 9.5 wt % PBSA + 85.5 wt % PLA 4032D | 1 mil | 10-15% | 1-2% |
| 25 wt % PLA 10361D + 75 wt % PLA 4032D | 1 mil | None | None |
| 25 wt % Talc + 25 wt % PLA 10361D + 50 wt % PLA 4032D | 1 mil | 5-6% | None |
| 10 wt % PEG 20K + 90 wt % PLA 4032D | 1.5 mil | 3-4% | None |
| 5 wt % Corn Starch + 10 wt % Glycerol + 85 wt % PLA 4032D | 2 mil | None | None |

Figure 2:
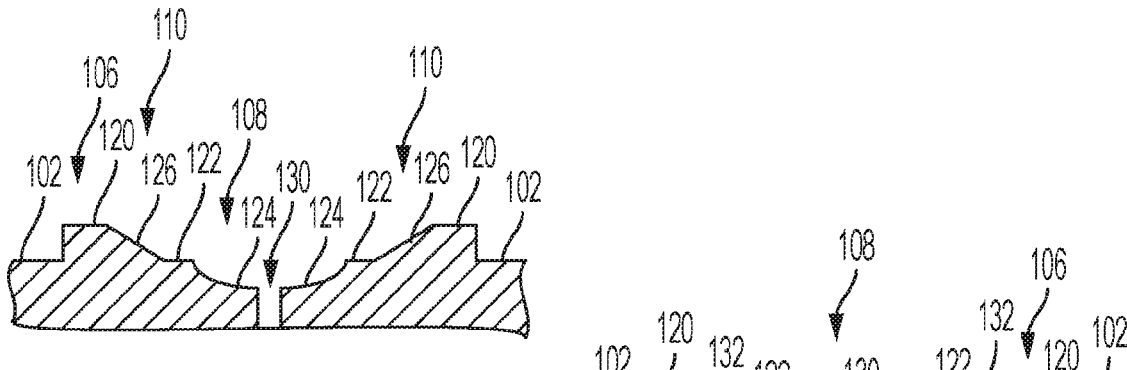
FIG. 2 illustrates a sectional view of FIG. 1 along line 2-2 in FIG. 1.
Figure 3:
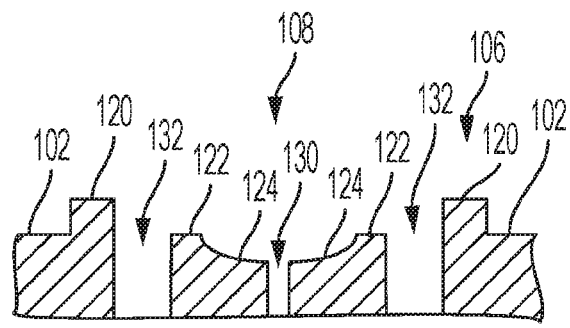
FIG. 3 illustrates a sectional view of FIG. 1 along line 3-3 in FIG. 1.

Referring to FIGS. 1-3, a portion of an exemplary carrier 100 is shown. Carrier 100 includes an exterior face 101 which includes a plurality of core supports 104 and connecting structure 102 interposed between the plurality of core supports 104. The cores supported by the plurality of core supports 104 are to be covered with a flexible film coating by a system incorporating carrier 100.

Each of plurality of core supports 104 includes a pedestal 108 on which a respective core is supported. The pedestal includes an outer shelf 122 and a concave region 124 positioned within shelf 122 (see FIG. 2). A central portion of concave region 124 includes an aperture 130 which is in fluid communication with a vacuum system as described in more detail herein. In embodiments, the profile of pedestal 108 may include one or more steps and/or have alternative shapes.

Each of the plurality of core supports 104 further includes an outer shelf 106 having a top surface 120 which is raised relative to connecting structure 102. Outer shelf 106 and pedestal 108 are connected by a plurality of bridge elements 110 which are separated by a plurality of apertures 132 (see FIGS. 1 and 3). Apertures 132 are in fluid communication with a vacuum system as described in more detail herein. In general, apertures 132 are positioned to correspond generally to a periphery region of the core supported on pedestal 108 (see FIG. 11).

As illustrated, each bridge element 110 includes a ramp surface 126 which spans from a top surface of outer shelf 122 of pedestal 108 and a top surface 120 of outer shelf 106. In embodiments, bridge element 110 may have a non-linear contour and/or may be offset from one or both of the top surface of outer shelf 122 of pedestal 108 and top surface 120 of outer shelf 106.

Figure 4:
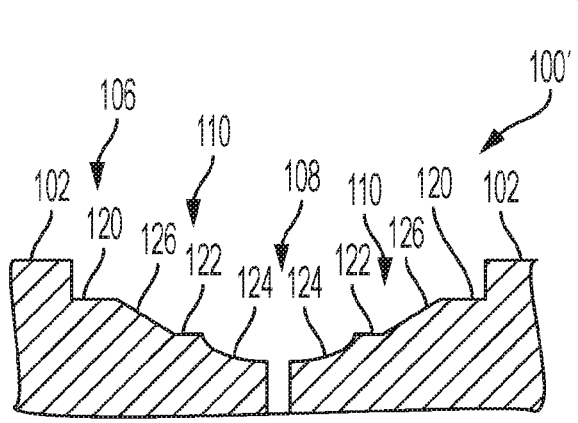
FIG. 4 illustrates a sectional view of an alternative embodiment of the first cavity of the exterior face of FIG. 1 along line 2-2 in FIG. 1.
Figure 5:
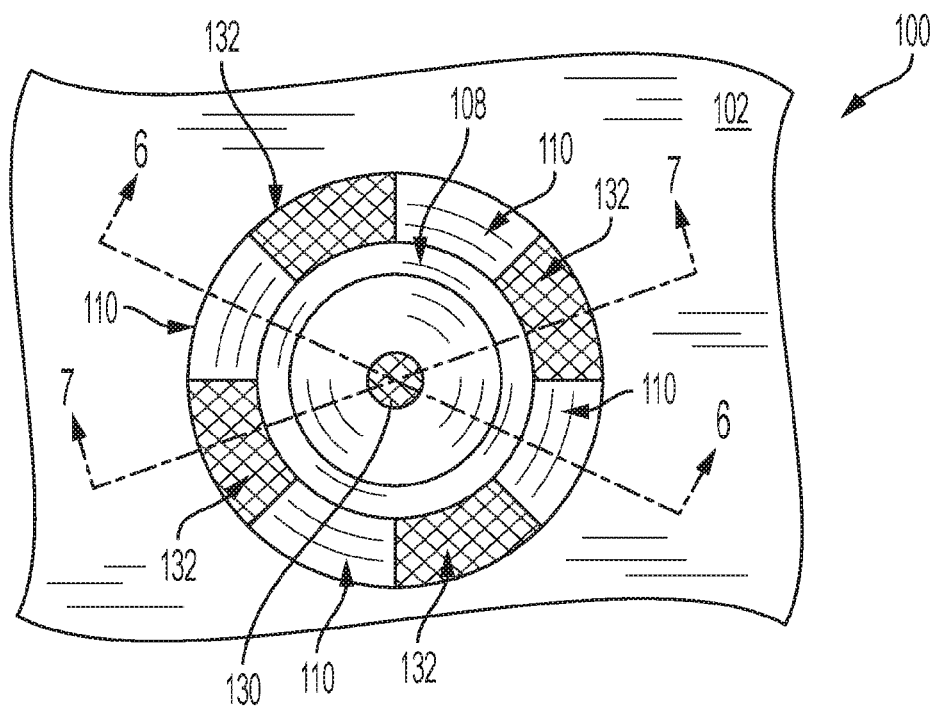
FIG. 5 illustrates a portion of another exemplary exterior face of a carrier for cores to be coated, the portion including a first cavity for receiving a first core to be coated.
Figure 6:
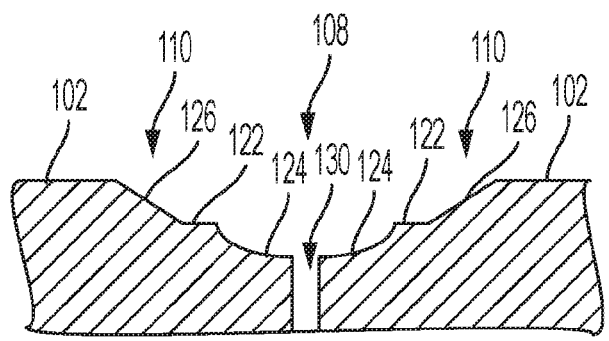
FIG. 6 illustrates a sectional view of FIG. 5 along line 6-6 in FIG. 5.
Figure 7:
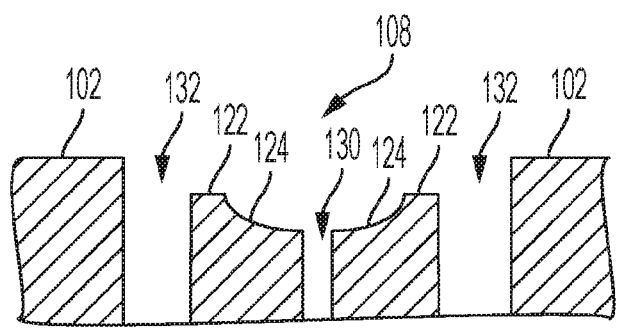
FIG. 7 illustrates a sectional view of FIG. 5 along line 7-7 in FIG. 5.

In an alternative embodiment (see FIG. 4), top surface 120 of outer shelf 106 is recessed relative to connecting structure 102 instead of raised relative to connecting structure 102 as shown in FIG. 2. In another alternative embodiment (see FIGS. 5-7), outer shelf 106 is not included and bridge elements 110 connect directly to connecting structure 102. In embodiments, bridge element 110 may have a non-linear contour and/or may be offset from one or both of the top surface of outer shelf 122 of pedestal 108 and top surface 120 of outer shelf 106.

Figure 8:
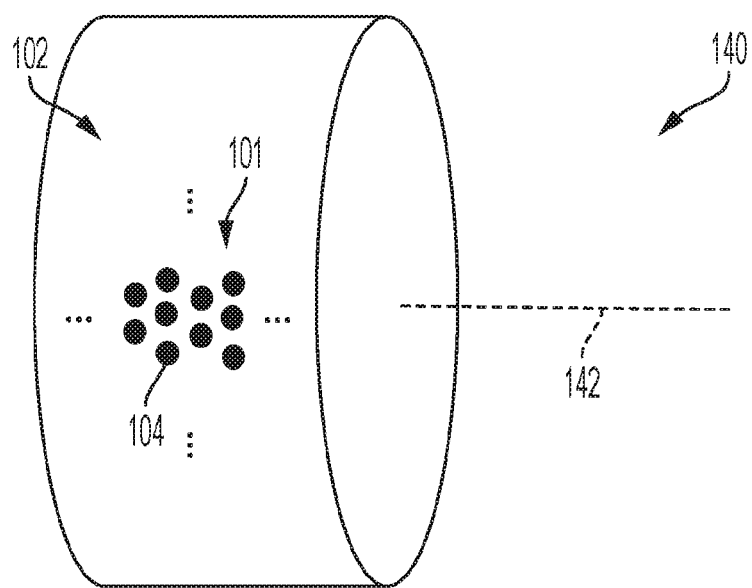
FIG. 8 illustrates a first exemplary carrier for cores to be coated.

Referring to FIG. 8, a first exemplary carrier 140 is illustrated that may incorporate the exterior face 101 of the exemplary carrier 100 shown in FIGS. 1-3 including the plurality of core supports 104 (one marked) and the connecting structure 102 or the alternative embodiments. As illustrated, carrier 140 includes a plurality of core supports 104 arranged in multiple rows and columns such that multiple cores may be coated simultaneously. Carrier 140 is a drum that rotates about axis 142 and that may be part of a rotatable coating system. Carrier 140, in embodiments, is a chill roll whose temperature is controlled to reduce adherence of the flexible film used for coating to the exterior face 101 of carrier 140. Carrier 140, in embodiments, includes portions of a vacuum system which is capable of independently applying a partial vacuum to fluid conduits terminating in aperture 130 and apertures 132 of respective core supports 104.

Figure 9:
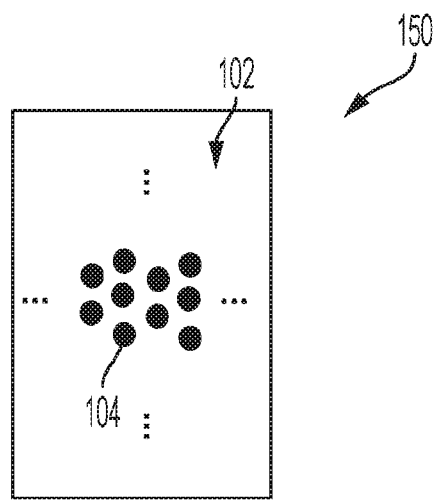
FIG. 9 illustrates a second exemplary carrier for cores to be coated.

Referring to FIG. 9, a second exemplary carrier 150 is illustrated that may incorporate the exterior face 101 of the exemplary carrier 100 shown in FIGS. 1-3 including the plurality of core supports 104 (one marked) and the connecting structure 102 or the alternative embodiments. As illustrated, carrier 140 includes a plurality of core supports 104 arranged in multiple rows and columns such that multiple cores may be coated simultaneously. Carrier 150 is a plate which may be part of a linear coating system. Carrier 150, in embodiments, is a chill plate whose temperature is controlled to reduce adherence of the flexible film used for coating to the exterior face 101 of carrier 150. Carrier 150, in embodiments, includes portions of a vacuum system which is capable of independently applying a partial vacuum to fluid conduits terminating in aperture 130 and apertures 132 of respective core supports 104.

Figure 11:
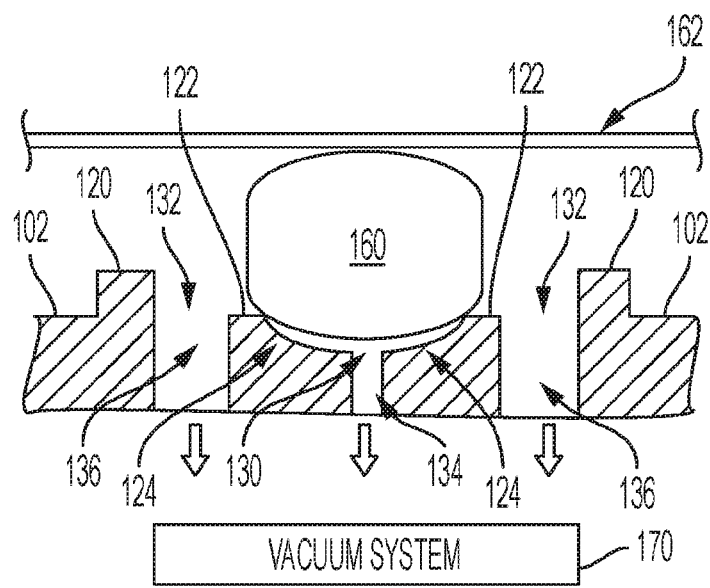
FIG. 11 illustrates the sectional view of FIG. 3 with the core supported on the pedestal and the flexible film positioned over the carrier including the cavity with the core supported on the pedestal.

Referring to FIGS. 10-15, the operation of carrier 100 is illustrated. FIGS. 10 and 11 correspond to FIGS. 2 and 3 with a core 160 supported by pedestal 108 and a flexible film 162 positioned over core 160, core support 104, and connecting structure 102. In embodiments, a vacuum system 170 holds core 160 to pedestal 108 by pulling a partial vacuum on an underside of core 160 through a fluid conduit 134 terminating in aperture 130. As shown in FIG. 11, vacuum system 170 does not pull a partial vacuum through fluid conduits 136 terminating in apertures 132.

Exemplary vacuum systems include one or more vacuum pumps, one or more valves, one or more fluid conduits, and combinations thereof. In embodiments, vacuum system 170 is able to independently apply a partial vacuum to fluid conduit 134 and to fluid conduits 136; thereby controlling which regions of core support 104 are under a partial vacuum. An advantage, among others, of having the ability to selectively apply a partial vacuum to different regions of core support 104 is increased efficiency in the operation and operational cost of vacuum system 170.

Figure 12:
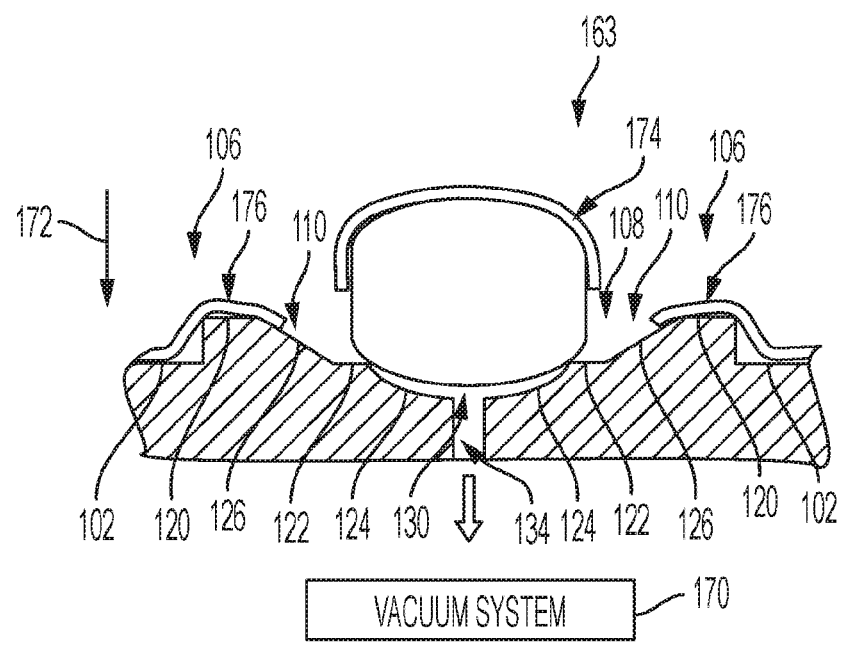
FIG. 12 illustrates the sectional view of FIG. 10 when a reduction in pressure is generated with a vacuum system in the region between the exterior face of the carrier and the flexible film.
Figure 13:
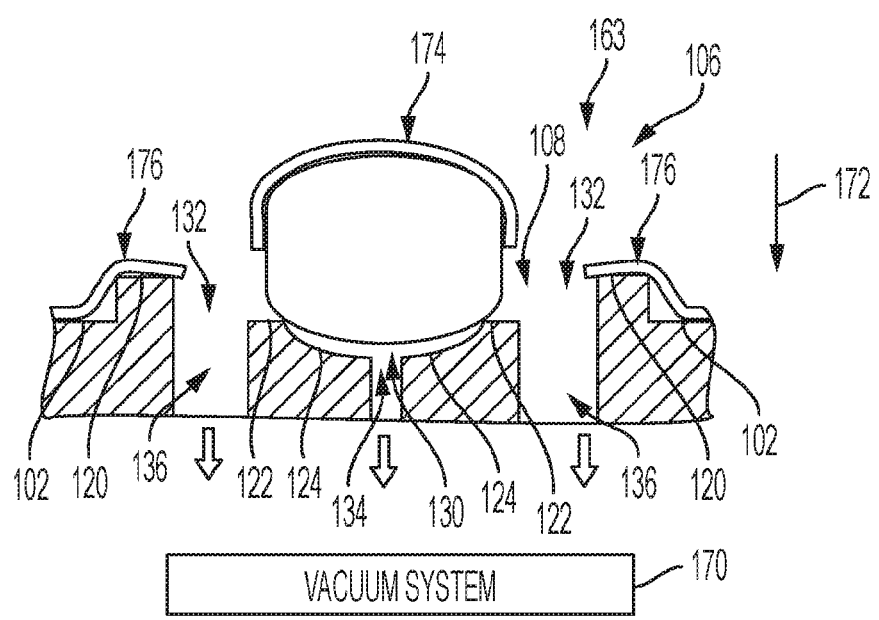
FIG. 13 illustrates the sectional view of FIG. 11 when the reduction in pressure is generated with a vacuum system in the region between the exterior face of the carrier and the flexible film.

Referring to FIGS. 12 (corresponding to FIG. 2) and 13 (corresponding to FIG. 3), vacuum system 170 has applied a partial vacuum to both fluid conduit 134 terminating in aperture 130 and fluid conduits 136 terminating in apertures 132. As a result, flexible film 162 has been pulled downward in direction 172. The partial vacuum in a core periphery region 163 corresponding to bridge elements 110 and apertures 132 stretches flexible film 162 to the point of breaking flexible film 162 into multiple pieces, specifically piece 174 of flexible film 162 which has adhered to an upper portion of core 160 and piece 176 which overlays outer shelf 106 and connecting structure 102. Piece 174 coats core 160 and forms part of the flexible film covering for core 160. The other side of core 160 may be coated by flipping core 160 over and repeating the application of flexible film 162. In embodiments, core 160 is flipped by transferring core 160 to another core support 104 of a second carrier 100. Piece 176 of flexible film 162 is removed as a sheet of material with holes corresponding to the locations of pieces 174 which had adhered to cores 160 supported by the plurality of core supports 104. As mentioned herein, carrier 100 may be chilled to assist in the removal of piece 176 from outer shelf 106 and connecting structure 102.

Figure 14:
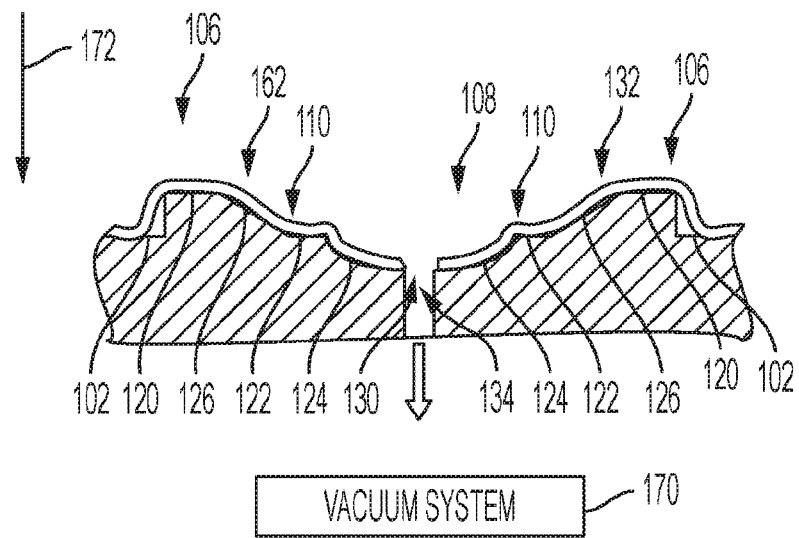
FIG. 14 illustrates the sectional view of FIG. 2 when a reduction in pressure is generated with a vacuum system in the region between the exterior face of the carrier and the flexible film and when no core is present.
Figure 15:
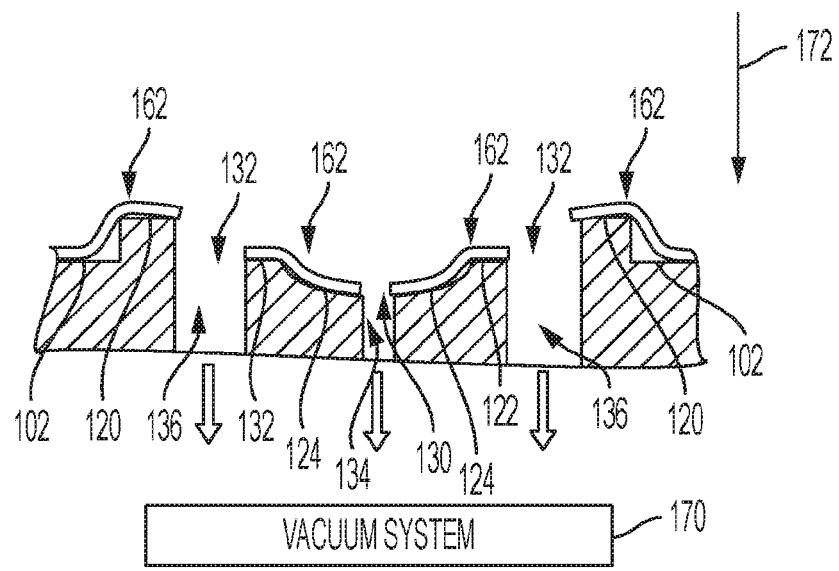
FIG. 15 illustrates the sectional view of FIG. 3 when the reduction in pressure is generated with a vacuum system in the region between the exterior face of the carrier and the flexible film and when no core is present.

Referring to FIGS. 14 (corresponding to FIG. 2) and 15 (corresponding to FIG. 3), one of the plurality of core supports 104 does not have a corresponding core 160. Vacuum system 170 has applied a partial vacuum to both fluid conduit 134 terminating in aperture 130 and fluid conduits 136 terminating in apertures 132. As a result, flexible film 162 has been pulled downward in direction 172 and remains as a single sheet. Flexible film 162 does include perforations corresponding to the regions over aperture 130 and apertures 132, but as shown in FIG. 14 the portions over pedestal 108, bridge elements 110, outer shelf 106, and connecting structure 102 remain interconnected and flexible film 162 generally conforms to the shapes of pedestal 108, bridge elements 110, outer shelf 106, and connecting structure 102.

In practice, a majority of the plurality of core supports 104 will have cores 160 supported thereon and a minority of the plurality of core supports 104 will have cores 160 missing. Thus, when flexible film 162 is removed, flexible film 162 is a sheet of material with holes corresponding to the locations of pieces 174 which had adhered to cores 160 supported by the majority of the plurality of core supports 104 and portions generally conforming to the shape of outer shelf 106, bridge elements 110, and pedestal 108 of core supports 104 with missing cores 160.

Figure 16:
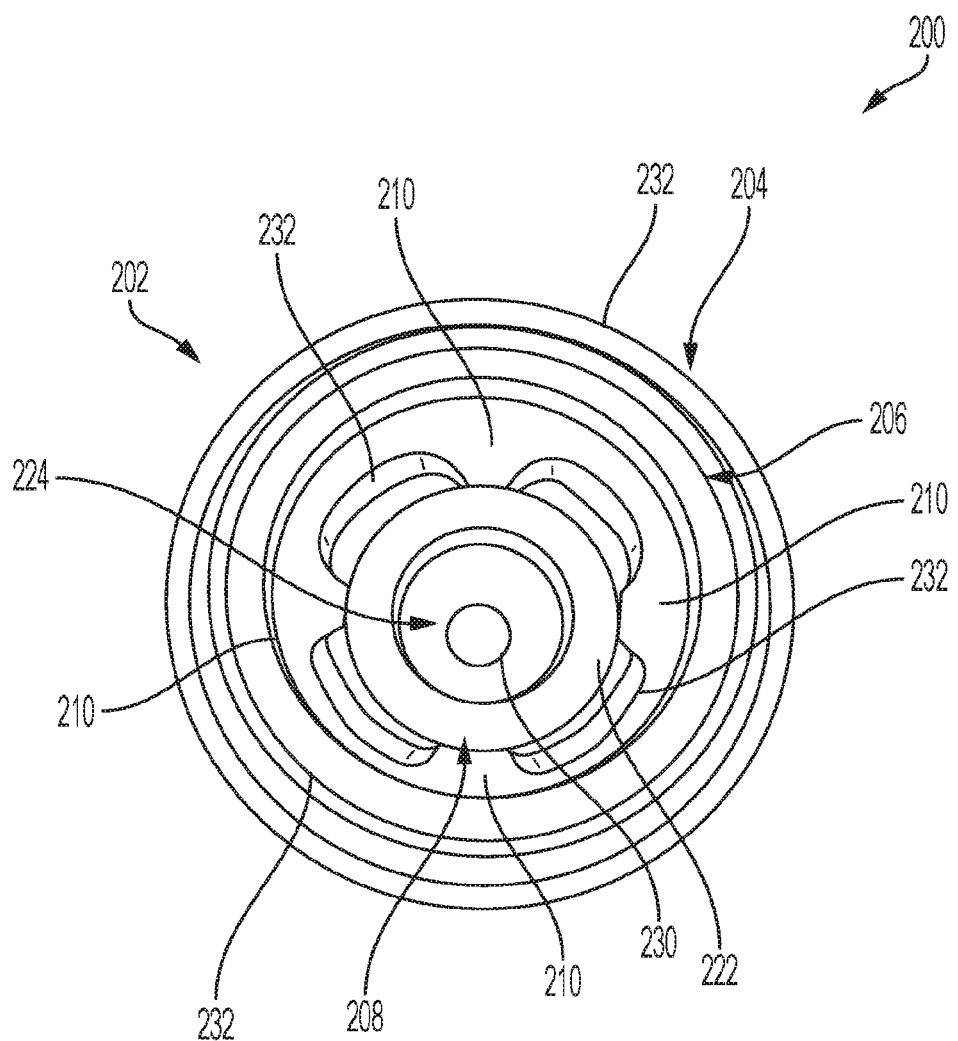
FIG. 16 illustrates a portion of an exemplary exterior face of another carrier for cores to be coated, the portion including a first cavity for receiving a first core to be coated.
Figure 18:
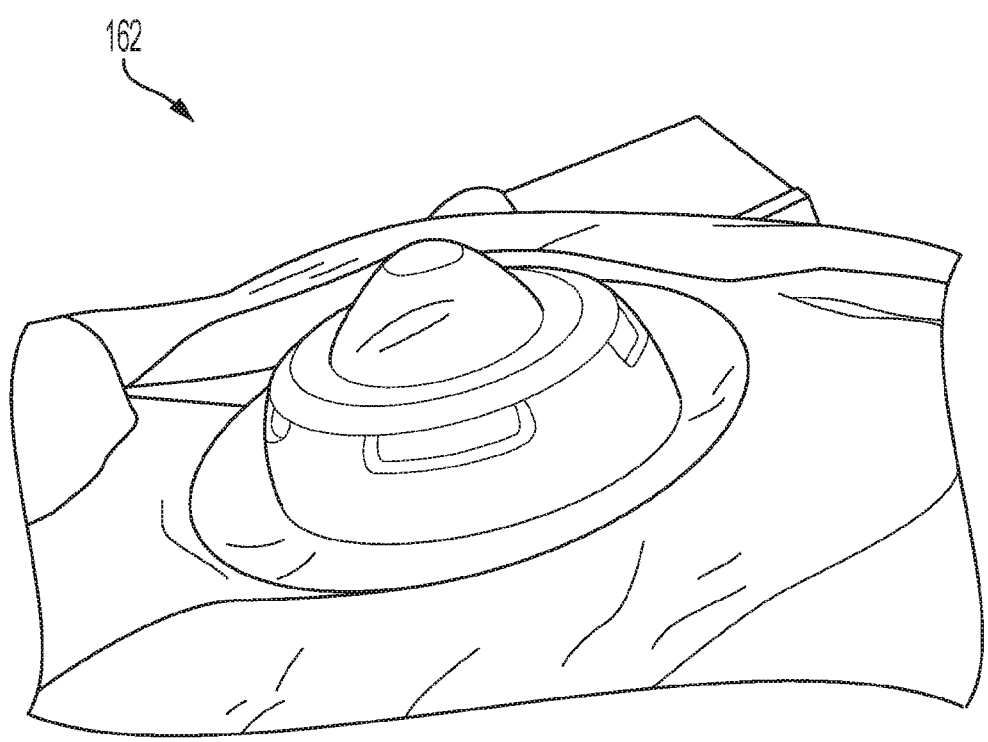
FIG. 18 illustrates the portion of the flexible film of FIG. 17, the portion of flexible film shown is from a side adjacent the exterior face of the carrier.

Referring to FIG. 16, an exemplary embodiment 200 of carrier 100 is illustrated. Carrier 200 has the same general structure as carrier 100 with some minor exceptions. For example, bridges 210 and apertures 232 of carrier 200 have different shapes than bridges 110 and apertures 132 of carrier 100. Referring to FIGS. 17 and 18, flexible film 162 is shown after having been conformed to the shape of connecting structure 202, outer shelf 206, bridges 210, and core support 208. The flexible film 162 is continuous in at least a plurality of regions from the connecting structure 202 to core support 208. FIG. 17 illustrates an upper side of flexible film 162 which was not adjacent to carrier 200 and FIG. 18 illustrates a lower side of flexible film 162 which was adjacent to carrier 200.

Figure 19:
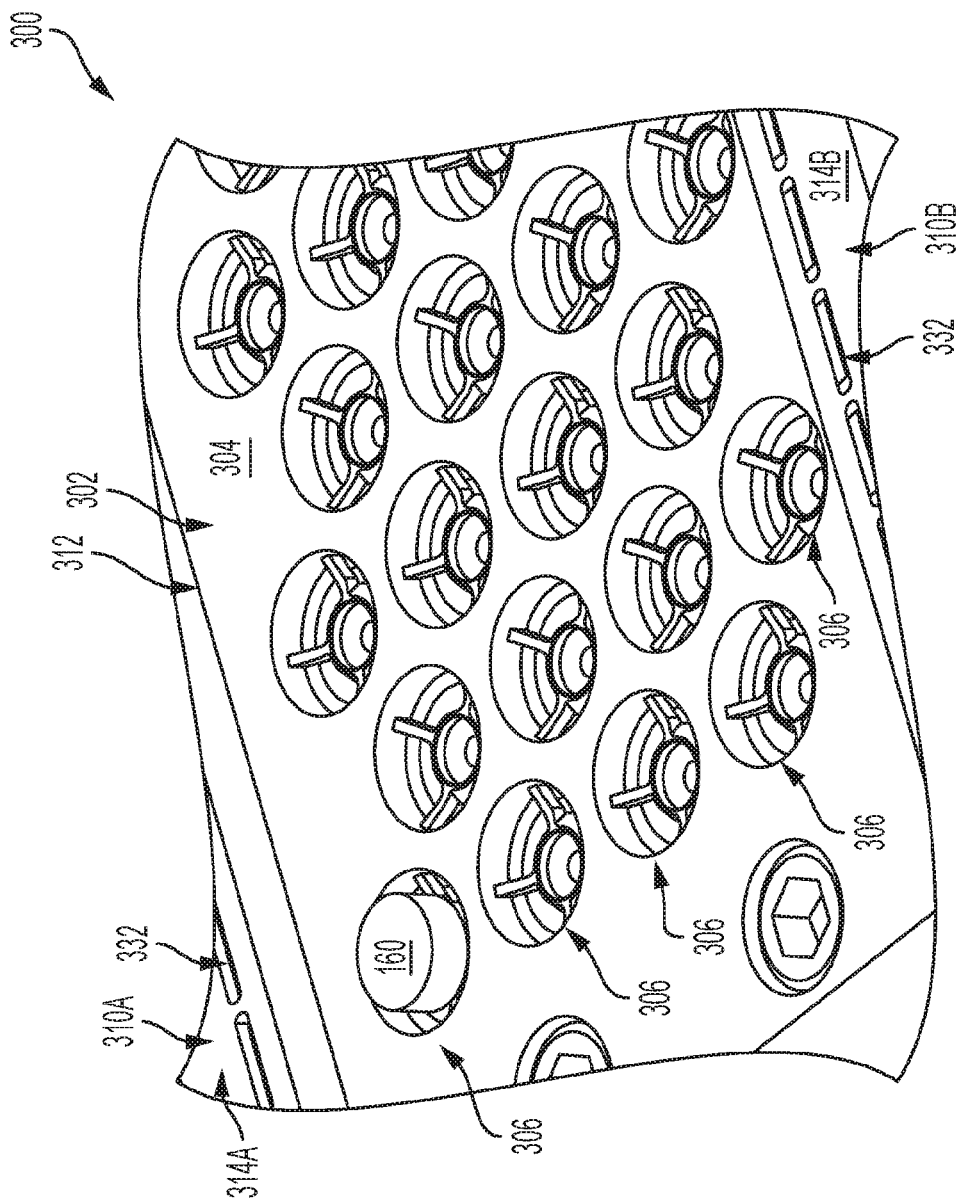
FIG. 19 illustrates a top, perspective view of a portion of a further exemplary carrier with two cores supported in respective cavities of an exterior face of the carrier.

Referring to FIGS. 19-26, another exemplary carrier 300 is shown. Carrier 300 includes a plate 302 having an upper surface 304 and a plurality of core supports 306 (five marked in FIG. 19) formed in recesses in plate 302. Referring to FIG. 19, plate 302 is recessed relative to film supports 310A, 310B positioned on the longitudinal sides of plate 302. An exterior face 312 of carrier 300 is composed of the top surfaces 314A, 314B of film supports 310A, 3106, the upper surface 304 of plate 302, and the upper surfaces of the plurality of core supports 306. A first one of core supports 306 is supporting a core 160. A second one of core supports 306 is supporting a spherical core 161.

Figure 20:
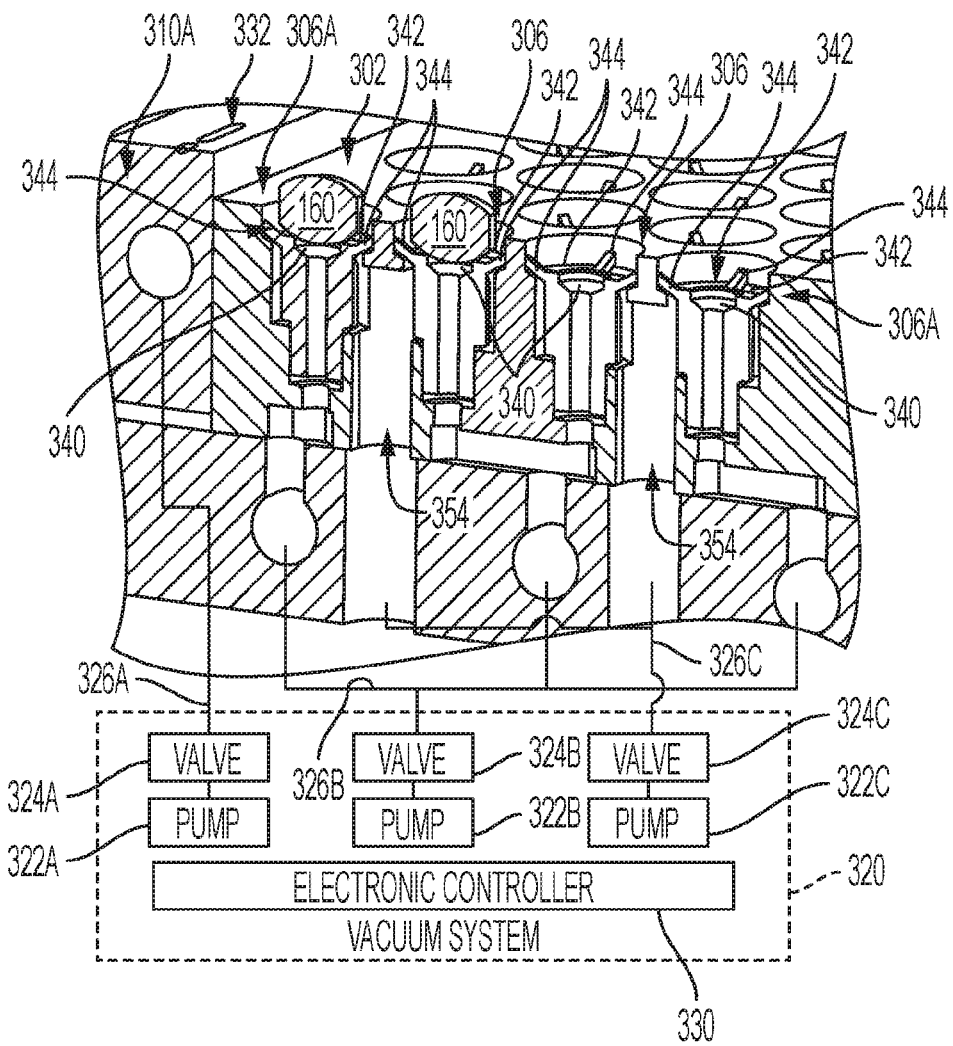
FIG. 20 illustrates a partial sectional view of the carrier of FIG. 19.

Referring to FIG. 20, a vacuum system 320 is represented. Vacuum system 320 includes a plurality of pumps 322A-C, a plurality of valves 324A-C, a plurality of fluid conduits 326A-C, and an electronic controller 330. In embodiments, each of the plurality of valves is formed by a stationary plate having radial openings in communication with the respective pump 322 and a moveable plate having openings in fluid communication with the respective apertures of carrier 300. As the moveable plate moves relative to the stationary plate, a first opening in the moveable plate aligns with a radial opening in the stationary plate to bring the respective apertures of carrier 300 into fluid communication with the respective pump 322 of vacuum system 320 ("valve open"). When the first opening in the moveable plate is not aligned with the radial opening in the stationary plate, the respective apertures of carrier 300 are not in fluid communication with the respective pump 322 of vacuum system 320 ("valve close").

Fluid conduit 326A is in fluid communication with a plurality of film securing apertures 332 in top surfaces 314A, 314B of film supports 310A, 310B. Fluid conduit 326A is in fluid communication with valve 324A which is in fluid communication with pump 322A. Valve 324A and pump 322A are operatively coupled to electronic controller 330 and controlled by electronic controller 330. Film 162 is positioned on top surfaces 314A, 314B of film supports 310A, 310B and held in place due to the partial vacuum pulled through film securing apertures 332 by pumps 322A when valves 324A is open. An advantage, among others, of holding the edges of film 162 relative to the central portion of the film above the cores 160 to be coated. Another advantage, among others, of holding the edges of film 162 is to minimize retraction of film 162 in a transverse direction.

In the illustrated embodiment, film securing apertures 332 are elongated along a longitudinal direction of the film supports 310A, 310B. An advantage, among others, of elongating the apertures along the longitudinal direction is that it increases the force holding the film 162 to the film supports 310A, 3106 without increasing a transverse diameter of the apertures. This advantage, over other aperture shapes, such as spherical apertures, allows the film to be more securely attached to the film support. The elongated film securing apertures shown in the Figures, such as in FIG.

19 and FIG. 20, comprise a plurality of elongated film securing apertures in the shape of elongated ovals or slots. As used herein, the term plurality of elongated film securing apertures also encompass a continuous or near continuous elongated aperture defining a border of the film support that secures the film to the support.

Fluid conduit 326B is in fluid communication with a plurality of apertures 340 in the central portions of core supports 306 and are positioned to hold cores 160 to core supports 306. Fluid conduit 326B is in fluid communication with valve 324B which is in fluid communication with pump 322B. Valve 324B and pump 322B are operatively coupled to electronic controller 330 and controlled by electronic controller 330. Cores 160 are positioned on top core supports 306 and held in place due to the partial vacuum pulled through apertures 340 by pump 322B when valve 324B is open.

Fluid conduit 326C is in fluid communication with a plurality of apertures 342 in core supports 306 and are positioned between bridges 344 of core supports 306 around the periphery of the cores 160 to stretch film 162 over cores 160. Fluid conduit 326C is in fluid communication with valve 324C which is in fluid communication with pump 322C. Valve 324C and pump 322C are operatively coupled to electronic controller 330 and controlled by electronic controller 330. Film 162 is positioned on top of cores 160 which are held in place by film supports 310A, 3106 and stretched over cores 160 due to the partial vacuum pulled through apertures 342 by pump 322C when valve 324C is open.

Electronic controller 164 includes logic which controls the operation of valves 324A-C (if electronically controlled) and pumps 322A-C. In embodiments, the logic may be software instructions and data stored on memory which is accessible by electrical controller 330 for execution. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which electronic controller 330 is not microprocessor-based, but rather is configured to control operation of valves 324A-C, pumps 322A-C, and/or other components of carrier 300 or the system including carrier 300 based on one or more sets of hardwired instructions. Further, electrical controller 330 may be contained within a single device or be a plurality of devices networked together or otherwise electrically connected to provide the functionality described herein.

In other embodiments, individual valves are not controlled by an electronic controller. For example, as mentioned herein, an alternative is to bring fluid passageways in the carrier into fluid communication with the vacuum system based on the position of the carrier relative to a support having openings in fluid communication with the vacuum system. Thus, when a respective fluid passageway in the carrier is aligned with the opening in the support the vacuum system is in fluid communication with the openings in the carrier connected to the fluid passageway and when the respective fluid passageway in the carrier is not aligned with the opening in the support the vacuum system is not in fluid communication with the openings in the carrier connected to the fluid passageway.

Figure 21:
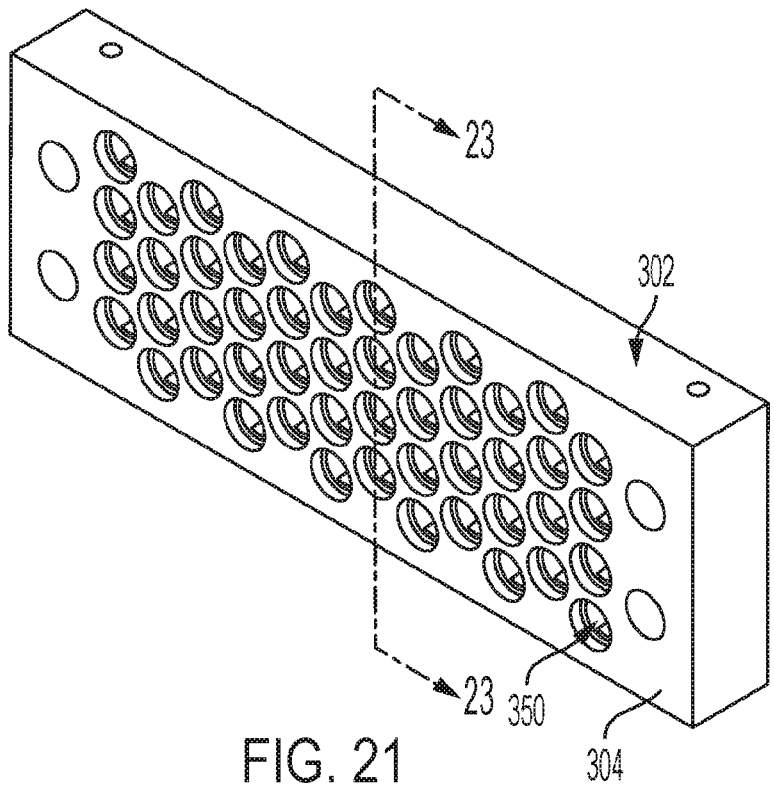
FIG. 21 illustrates an upper, perspective view of a base of the exterior face of the carrier of FIG. 19.
Figure 22:
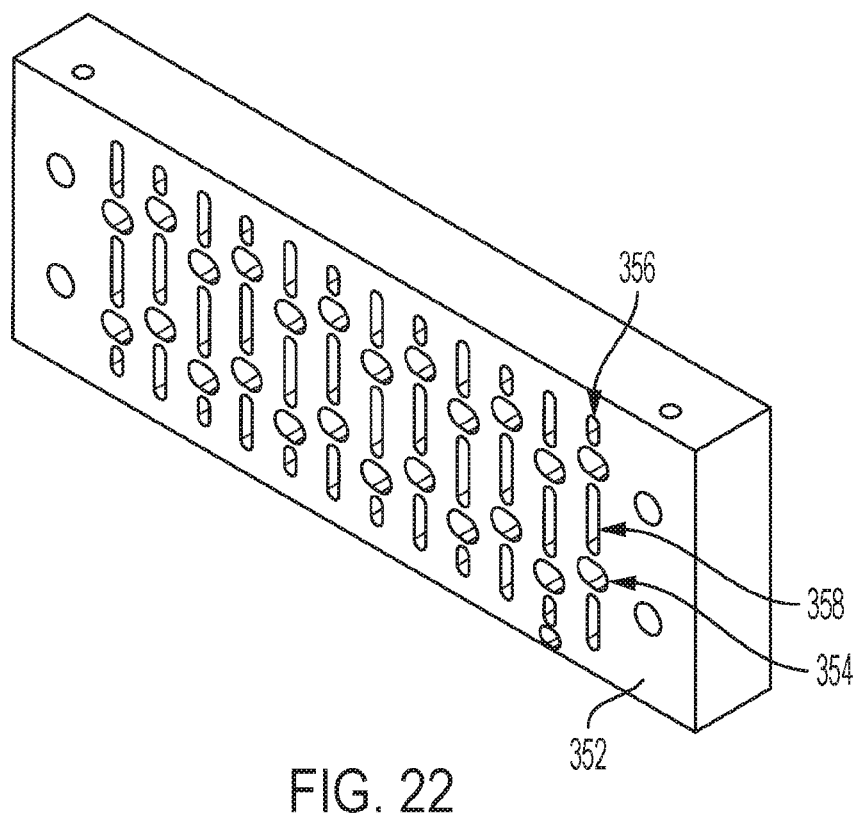
FIG. 22 illustrates a lower, perspective view of the base of FIG. 21.
Figure 23:
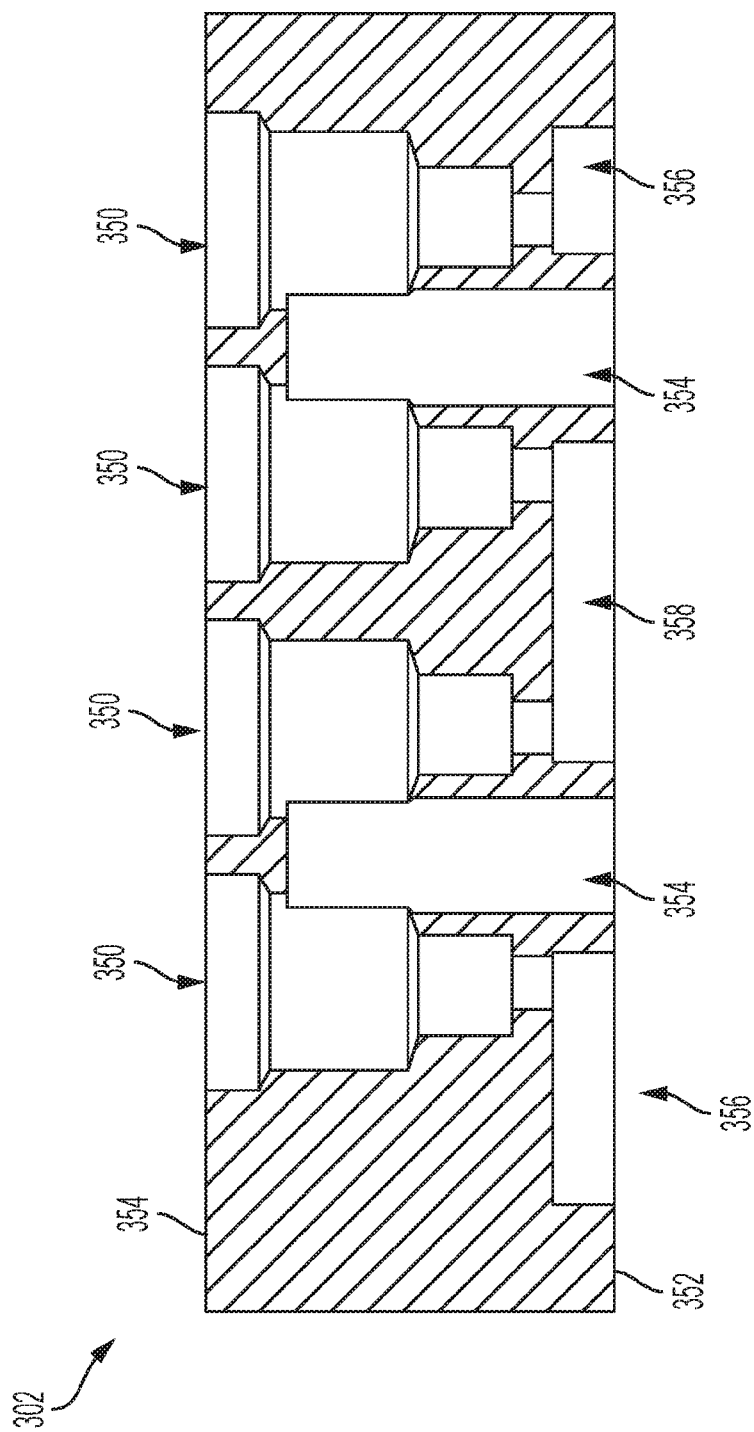
FIG. 23 illustrates a sectional view along lines 23-23 in FIG. 21.
Figure 24:
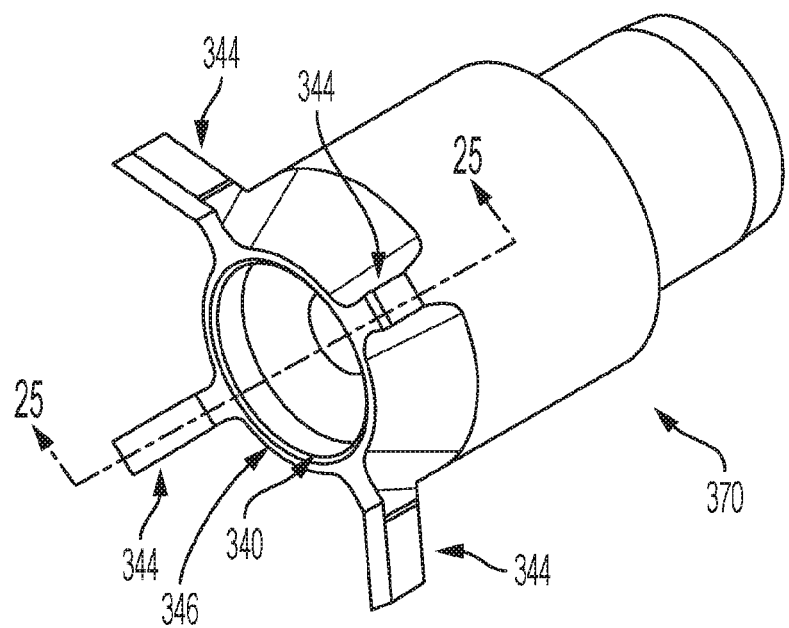
FIG. 24 illustrates an upper, perspective view of a pedestal for inclusion in the carrier of FIG. 19.

Referring to FIGS. 21-23, plate 302 includes a plurality of recesses 350 (one marked) in upper surface 304 of plate 302. Recesses 350 form apertures 342 of core supports 306. Plate 302 includes a first plurality of recesses 354 (one marked in FIG. 22) which intersects two of recesses 350 and couples recesses 350 to fluid conduit 326C. Plate 302 further includes a second plurality of recesses 356 (one marked in FIG. 22) and a third plurality of recesses 358 (one marked in FIG. 22). Each of recesses 356 is in fluid communication with a central portion of a corresponding recess 350 and each of recesses 358 is in fluid communication with a plurality of recesses 350. Each of recesses 356 and recesses 358 are in fluid communication with fluid conduit 326B.

The central support 346 of core supports 306 and bridges 344 are part of an insert 370 (see FIGS. 24 and 25) which is received in recesses 350. The central support is provided by a support 345 of insert 370. Bridges 344 separate recesses 350 into a plurality of apertures 344 of core supports 306 which are positioned about the periphery of the cores supported on core supports 306. Insert 370 is coupled to plate 302 by either a press fit of lower portion 374 of insert 370 into recess 350, threaded engagement between lower portion 374 of insert 370 and the walls of recess 350, or other suitable connections. Insert 370 further includes a fluid conduit 372 which brings apertures 340 into fluid communication with fluid conduit 326B.

Figure 26:
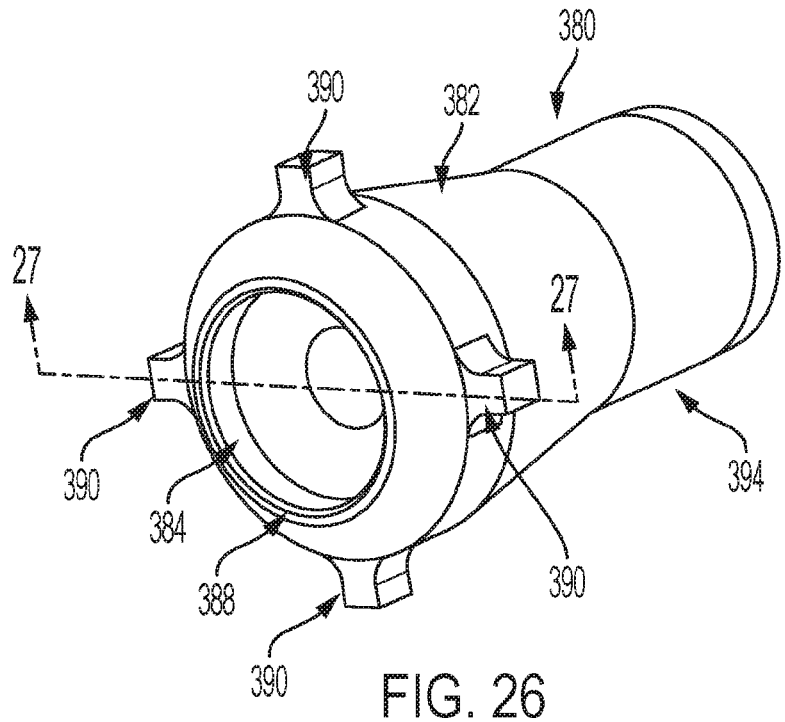
FIG. 26 illustrates an upper, perspective view of another exemplary pedestal for inclusion in the carrier of FIG. 19.
Figure 27:
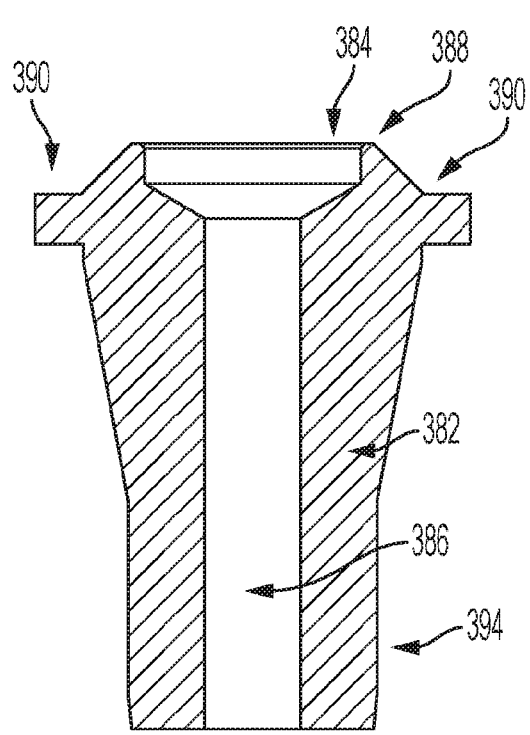
FIG. 27 illustrates a sectional view along lines 27-27 in FIG. 26.

An alternative insert 380 is shown in FIGS. 26 and 27. Insert 380 includes a body 382 which defines a central aperture 384 (corresponding to aperture 340 of insert 370) which is in fluid communication with a fluid conduit 386 (corresponding to fluid conduit 372 of insert 370). Cores 160 or 161 are positioned on support 388 surrounding aperture 384. Insert 380 further includes bridges 390 (corresponding to bridges 344 of insert 370) which connect support 388 to exterior surface 304 of plate 302 when insert 380 is received in recesses 350. Bridges 390 separate recesses 350 into a plurality of apertures 342 (see FIG. 27A) of core supports 306 which are positioned about the periphery of the cores supported on core supports 306.

Figure 25:
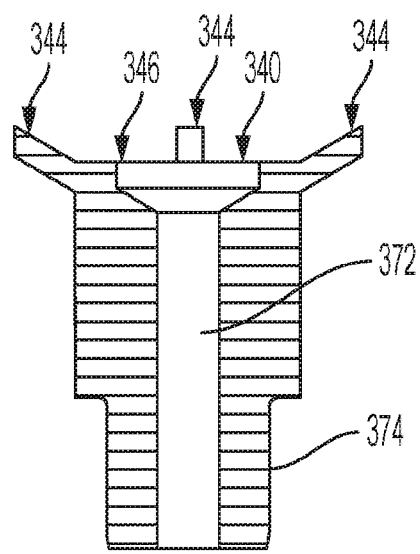
FIG. 25 illustrates a sectional view along lines 25-25 in FIG. 24.
Figure 27A:
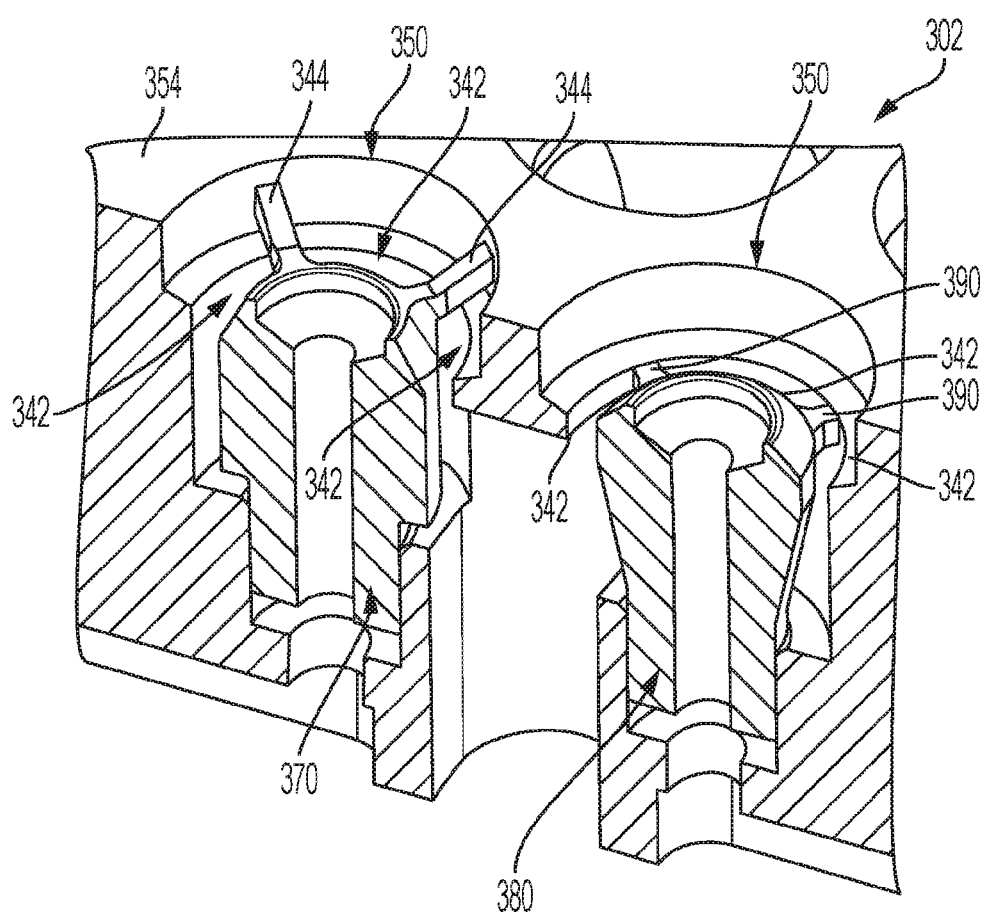
FIG. 27A illustrates a portion of the carrier of FIG. 19 with an insert of FIG. 24 positioned in a first recess of the carrier and an insert of FIG. 26 positioned in a second recess of the carrier.

Referring to FIG. 27A, insert 370 is positioned in a first recess 350 of plate 302 and insert 380 is positioned in a second recess 350 of plate 302. As shown in FIG. 27A, bridges 344 of insert 370 extend closer to upper surface 354 of plate 302 than bridges 390 of insert 380. Referring to FIG. 25, bridges 344 of insert 370 extend above support 346 of insert 370. In contrast, support 388 of insert 380 extends above bridges 390 of insert 380. Both of bridges 344 of insert 370 and bridges 390 of insert 380 connect the respective central core support portion 346, 388 of the respective insert 370, 380 to the walls of the respective recess 350 to provide a continuous connection for flexible film 162 to conform to in the absence of a core on the respective core support portion 346, 388.

An advantage, among others, of having bridges 390 of insert 380 lower than support 388 is that a greater distance is provided for film 162 to stretch and break relative to upper surface 354 of plate 302 without contacting bridges 390 when a core is supported by support 388. The distance from upper surface 354 to bridges 390 remains small enough for the film being used that in the absence of a core 160 supported by support 388 the film does not break in the region over bridges 390, but rather conforms to the upper surface of bridges 390 to continue to connect the flexible film 162 over the recess 350 and insert 380 to the remainder of the film lattice.

Insert 380 is coupled to plate 302 by either a press fit of lower portion 394 of insert 380 into recess 350, threaded engagement between lower portion 394 of insert 380 and the walls of recess 350, or other suitable connections. Insert 380 further includes a fluid conduit 386 which brings aperture 340 into fluid communication with fluid conduit 326B (see FIG. 20).

Each of inserts 370 and 380 are shown with four respective bridges 344, 390. In embodiments, fewer or more bridges may be included. In embodiments, at least two bridges are provided. In embodiments, up to six bridges are provided.

In embodiments, plate 302 and inserts 370, 380 are made of aluminum. In embodiments, a temperature of plate 302 and inserts 370, 380 is maintained below about 54 degrees Celsius.

Figure 28:
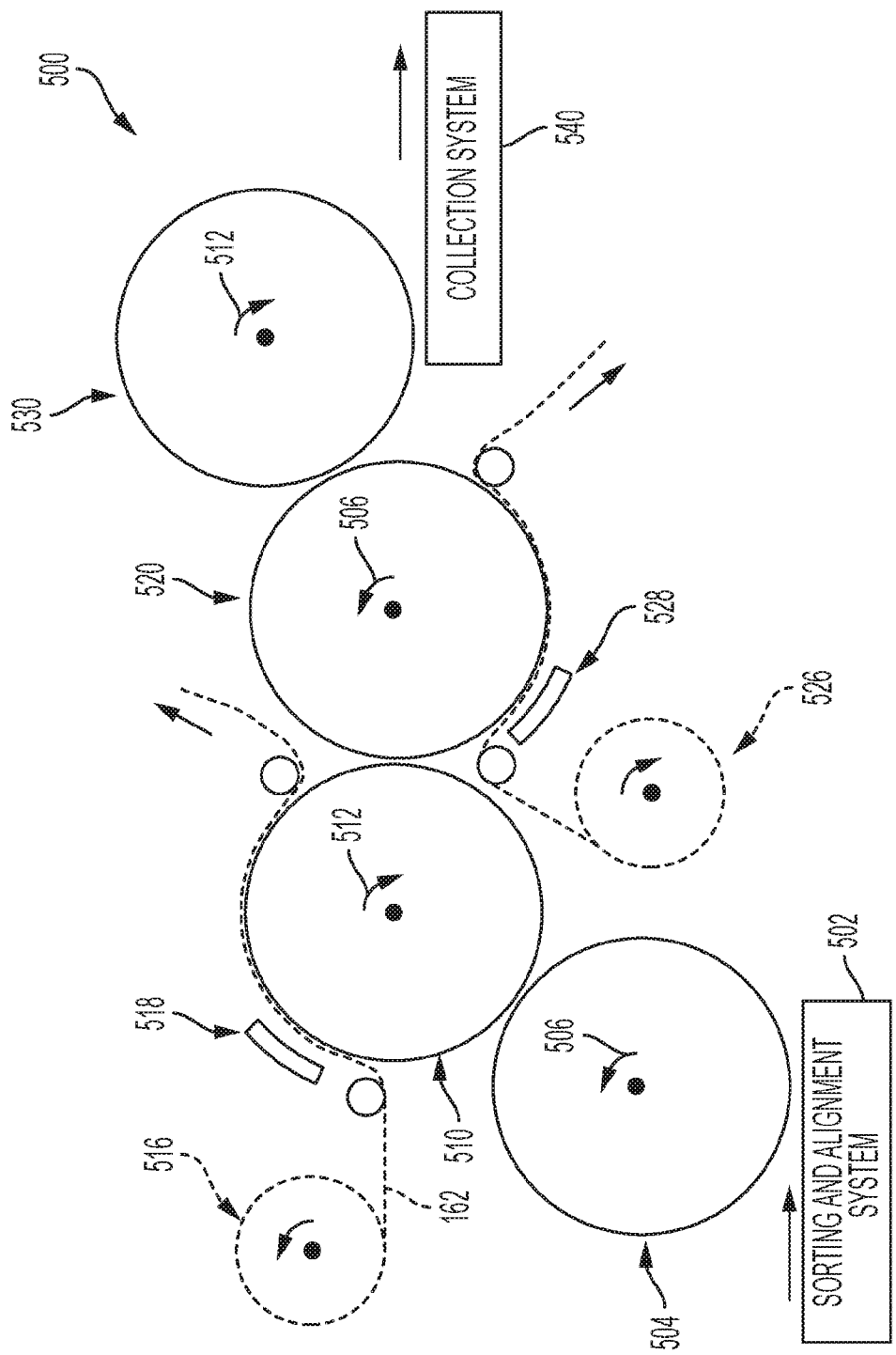
FIG. 28 illustrates a representative view of a system for continuously coating a plurality of cores with multiple flexible films.

Referring to FIG. 28, a system 500 is illustrated. System 500 includes a sorting and alignment system 502 which arranges cores 160 into an arrangement corresponding to a plurality of core supports of a first carrier 504. Carrier 504 rotates in a first direction 506 and includes a vacuum system which couples the cores 160 to carrier 504. The cores 160 are transferred to a second carrier 510.

Carrier 510 rotates in a second direction 512. As carrier 510 rotates in direction 512, a flexible film 162 is unwound from a roller 516 and overlaid on cores 160 as described herein and held relative to carrier 510 as described in connection with carrier 300. The flexible film 162 is treated to increase a formability of the flexible film. Exemplary methods of treatment include exposure to radiation, heating, chemical treatment, and other suitable methodologies. In the illustrated embodiment, the flexible film 162 is heated by a heating system 518 and coats the upper portion of cores 160 as described herein in connection with carriers 100, 200, 300, and the excess flexible film 162 is removed. In embodiments, carrier 510 is temperature controlled to assist in the removal of the excess flexible film 162 from the surface of carrier 510. The half coated cores 160 are transferred to a third carrier 520.

Carrier 520 rotates in first direction 506. As carrier 520 rotates in direction 506, a flexible film 162 is unwound from a roller 526 and overlaid on cores 160 as described herein and held relative to carrier 520 as described in connection with carrier 300. The flexible film 162 is heated by a heating system 528, coats the upper portion of cores 160 (which corresponded to the lower portions of cores 160 on carrier 510) as described herein in connection with carriers 100, 200, 300, and the excess flexible film 162 is removed. In embodiments, carrier 510 is temperature controlled to assist in the removal of the excess flexible film 162 from the surface of carrier 510. The fully coated cores 160 are transferred to a fourth carrier 530.

Carrier 530 rotates in second direction 512 and includes a vacuum system which couples the cores 160 to carrier 530. The cores 160 are transferred to a collection system 540. Exemplary collection systems 540 include bins and other suitable receptacles.

Each of carriers 504 and 530 are in fluid communication with a vacuum system that is in fluid communication with the core supports of carriers 504 and 530. In embodiments, a rotational position of the respective carrier 504 and 530 controls when the core supports of the respective carrier 504 and 530 are in fluid communication with the vacuum system. For example, a fluid passageway in the respective carrier which is in fluid communication with a respective core support of the carrier moves as the carrier is rotated and is in fluid communication with the vacuum system when the fluid passageway aligns with an opening in a support to which the carrier is coupled. The opening in the support is in fluid communication with the vacuum system. When the fluid passageway in the carrier is not aligned with the opening in the support, the respective core support is not in fluid communication with the vacuum system. In embodiments, a respective core support is in fluid communication with an angular opening in the support that is in fluid communication with the vacuum source when the respective core support is in a transfer-in zone 550 (see FIGS. 29 and 30) and is not in fluid communication with the vacuum source when the respective core support is in a transfer-out zone 552 (see FIGS. 29 and 30).

Figure 29:
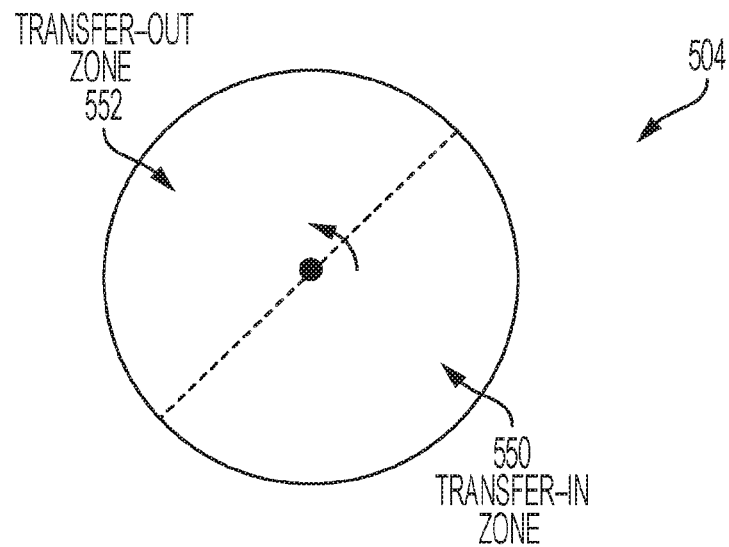
FIG. 29 illustrates vacuum zones for a first carrier of the system of FIG. 28.
Figure 30:
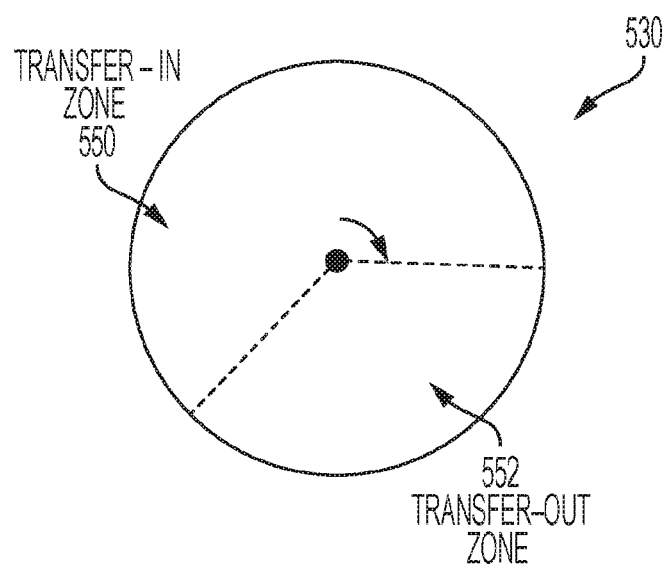
FIG. 30 illustrates vacuum zones for a fourth carrier of the system of FIG. 28.
Figure 31:
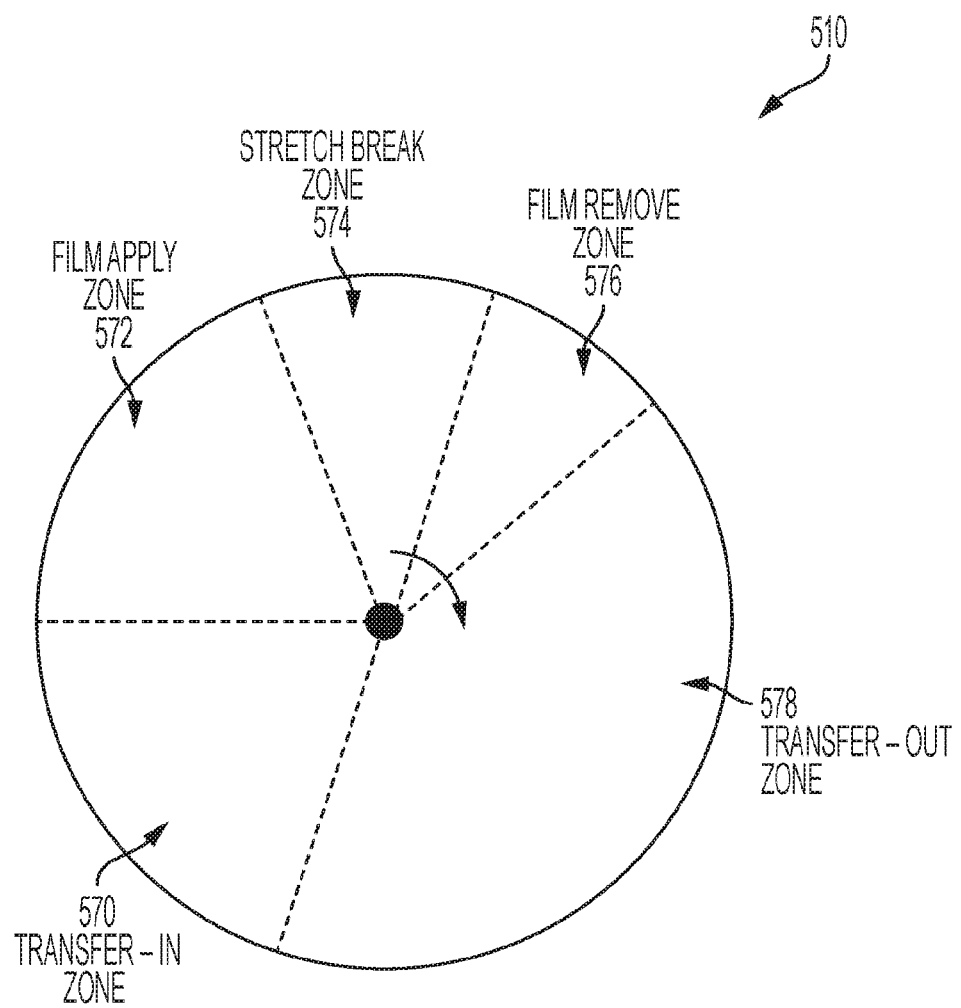
FIG. 31 illustrates vacuum zones for a second carrier of the system of FIG. 28.

Referring to FIG. 29, in the transfer-in zone 550 of carrier 504, cores 160 are coupled to carrier 504 from sorting and alignment system 502 and held to carrier 504 until alignment with carrier 510 for transfer to carrier 510. When aligned with carrier 510, the respective core support of carrier 504 passes to the transfer-out zone 552 and the vacuum system is not in fluid communication with the respective core support. Referring to FIG. 31, in the transfer-in zone 550 of carrier 530, cores 160 are coupled to carrier 530 from carrier 520 and held to carrier 530 until transfer to collection system 540.

Referring to FIG. 31, the vacuum zones of carrier 510 are shown. In embodiments, carrier 510 has the arrangement of carrier 300 positioned about the cylindrical shape of carrier 510 and is connected to vacuum system 320. In the transfer-in zone 570 of carrier 510, a respective core support 306 couples a core 160 from carrier 504 whose corresponding core support is now in the transfer-out zone 552. As shown in the following table, vacuum system 320 pulls a partial vacuum on the underside of core 160 through aperture 340 of the respective core support 306 in the transfer-in zone 570. As the respective core support 306 rotates to the film apply zone 572, vacuum system 320 further pulls a partial vacuum on the edges of flexible film 162 through film securing apertures 332. The flexible film 162 is heated by heating system 518 in this zone. In embodiments, heating system 518 heats flexible film 162 above the glass transition temperature of the flexible film 162 to render the flexible film 162 pliable and conformable to the shape of cores 160. As the respective core support 306 rotates to the stretch/break zone 574, vacuum system 320 further pulls a partial vacuum through apertures 342 to stretch and break flexible film 162 about core 160 (see FIGS. 12 and 13 for example). As the respective core support 306 rotates to the film remove zone 576, vacuum system 320 is not in fluid communication with film securing apertures 332 nor with apertures 342. As the respective core support 306 rotates to the transfer-out zone 578, vacuum system is not in fluid communication with any of film securing apertures 332, 340, nor 342.

TABLE 1

Vacuum System Timing ("Yes" = partial vacuum; "No" = no vacuum)

| Zone | Film edges (322A, 324A, 326A) | Core (322B, 324B, 326B) | Stretch/Break Film (322C, 324C, 326C) |
|---|---|---|---|
| Transfer-In Zone (570) | No | Yes | No |
| Film Apply Zone (572) | Yes | Yes | No |

TABLE 1-continued

Vacuum System Timing ("Yes" = partial vacuum; "No" = no vacuum)

| Zone | Film edges (322A, 324A, 326A) | Core (322B, 324B, 326B) | Stretch/Break Film (322C, 324C, 326C) |
|---|---|---|---|
| Stretch/Break Zone (574) | Yes | Yes | Yes |
| Film Remove Zone (576) | No | Yes | No |
| Transfer-Out Zone (578) | No | No | No |

Figure 32:
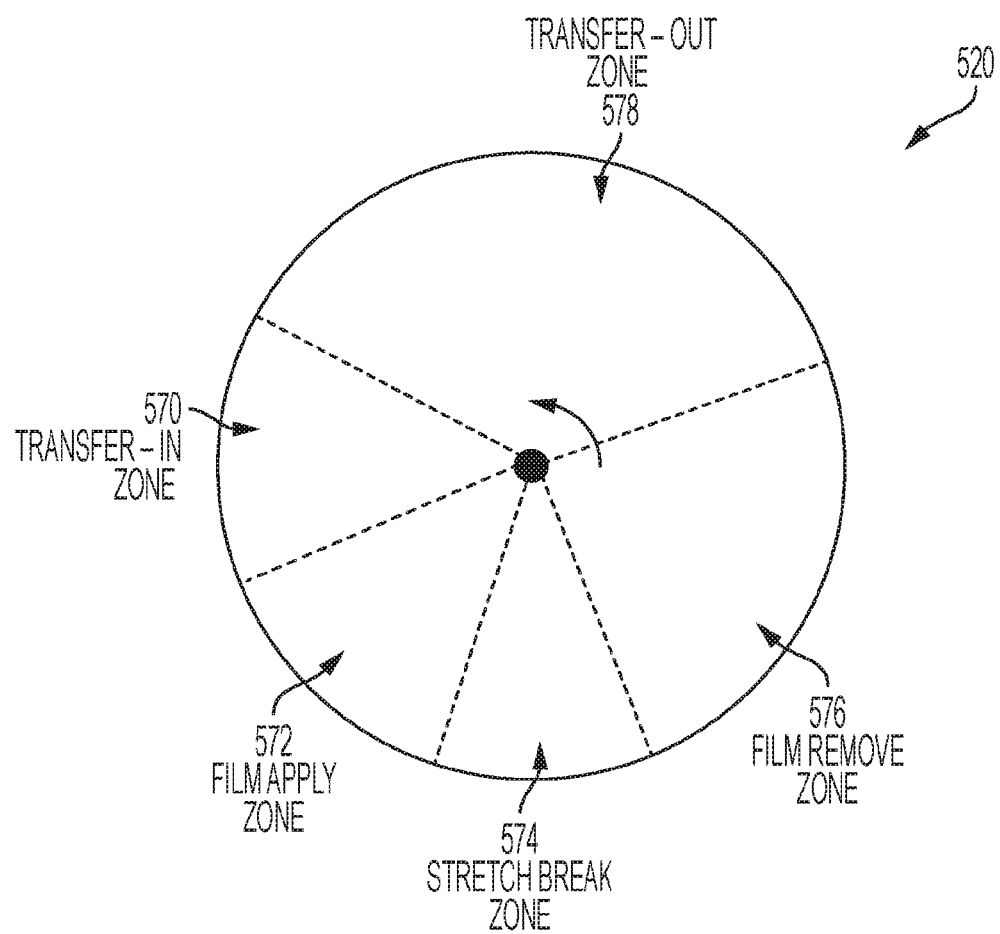
FIG. 32 illustrates vacuum zones for a third carrier of the system of FIG. 28.

Referring to FIG. 32, the vacuum zones of carrier 520 are shown. In embodiments, carrier 520 has the arrangement of carrier 300 positioned about the cylindrical shape of carrier 520 and is connected to vacuum system 320. In the transfer-in zone 570 of carrier 520, a respective core support 306 couples core 160 from carrier 510 whose respective core support is in the transfer-out zone 578 of carrier 510. As shown in the above table, vacuum system 320 pulls a partial vacuum on the underside of core 160 through aperture 340 of the respective core support 306 in the transfer-in zone 570. As the respective core support 306 rotates to the film apply zone 572, vacuum system 320 further pulls a partial vacuum on the edges of flexible film 162 through film securing apertures 332. The flexible film 162 is heated by heating system 528 in this zone. In embodiments, heating system 518 heats flexible film 162 above the glass transition temperature of the flexible film 162 to render the flexible film 162 pliable and conformable to the shape of cores 160. As the respective core support 306 rotates to the stretch/break zone 574, vacuum system 320 further pulls a partial vacuum through apertures 342 to stretch and break flexible film 162 about core 160 (see FIGS. 12 and 13 for example). As the respective core support 306 rotates to the film remove zone 576, vacuum system 320 is not in fluid communication with film securing apertures 332 nor with apertures 342. As the respective core support 306 rotates to the transfer-out zone 578, vacuum system 320 is not in fluid communication with any of apertures 332, 340, nor 342.

In embodiments, a spacing between the individual carriers 504, 510, 520, and 530 may be adjusted based on a size of cores 160 or cores 161. An advantage, among other, of the ability to adjust the spacing between the individual carriers 504, 510, 520, and 530 is that lower vacuum levels may be used to transfer cores between the respective carriers due to the reduced spacing between the cores and the carrier to which the cores are to be transferred.

Figure 33:
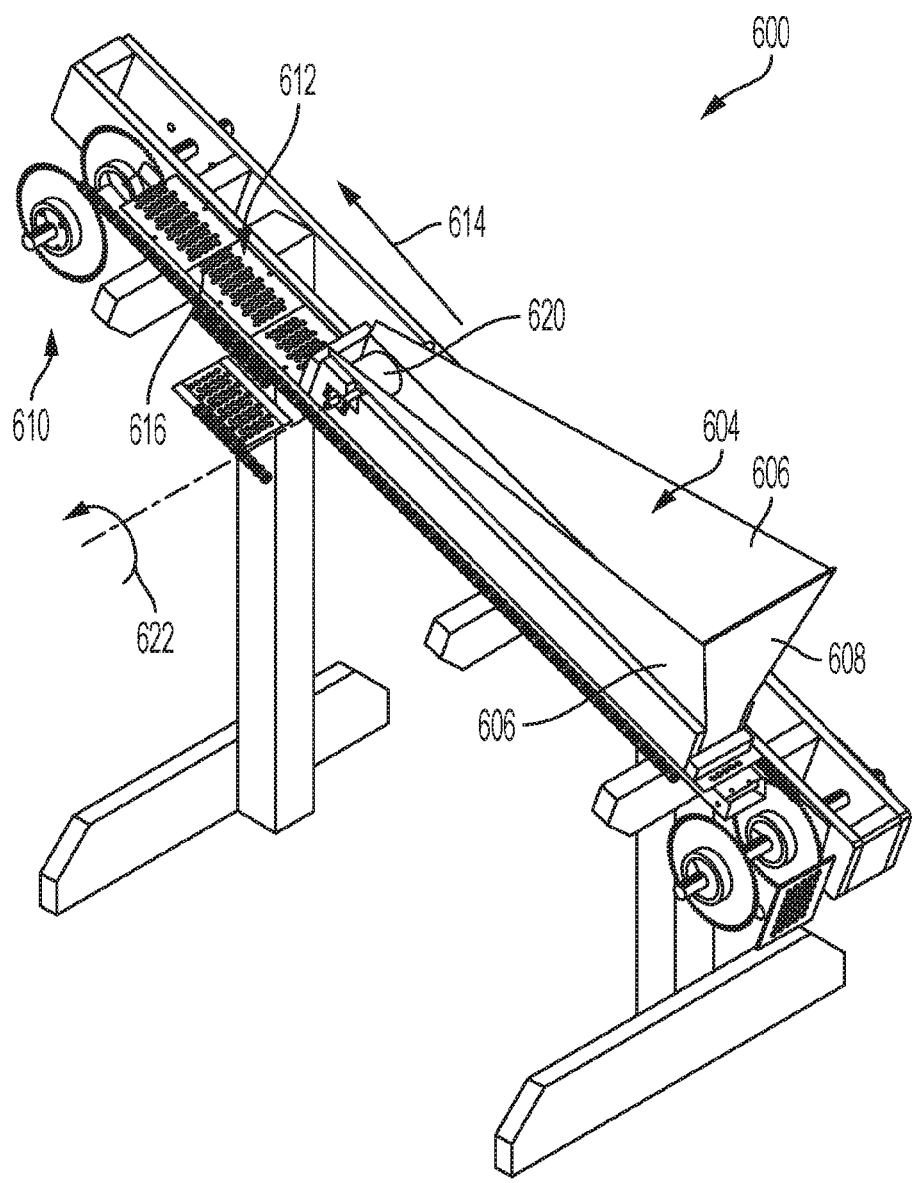
FIG. 33 illustrates an exemplary sorting and alignment system.

Referring to FIG. 33, an exemplary sorting and alignment system 600 is shown. Sorting and alignment system 600 includes a hopper 604 into which a bulk amount of cores 160 are deposited. Hopper 604 includes side walls 606 and an end wall 608. Sorting and alignment system 600 further includes a conveyor system 610 having a carrier 612, illustratively a plurality of plates (one marked), moveable in direction 614. In other various embodiments, carrier 612 may be a continuous member such as a belt or a continuous plate. A bottom of hopper 604 is open to accommodate carrier 612. As carrier 612 moves in direction 614, individual cores 160 are received in recesses 616 (one marked) of carrier 612. In embodiments, carrier 612 is arranged to travel upward at an angle relative to horizontal to assist in the movement of individual cores into recesses 616 of carrier 612. In one embodiment, carrier 612 is arranged to travel upward at an angle of about 20 degrees to about 35 degrees.

Figure 34:
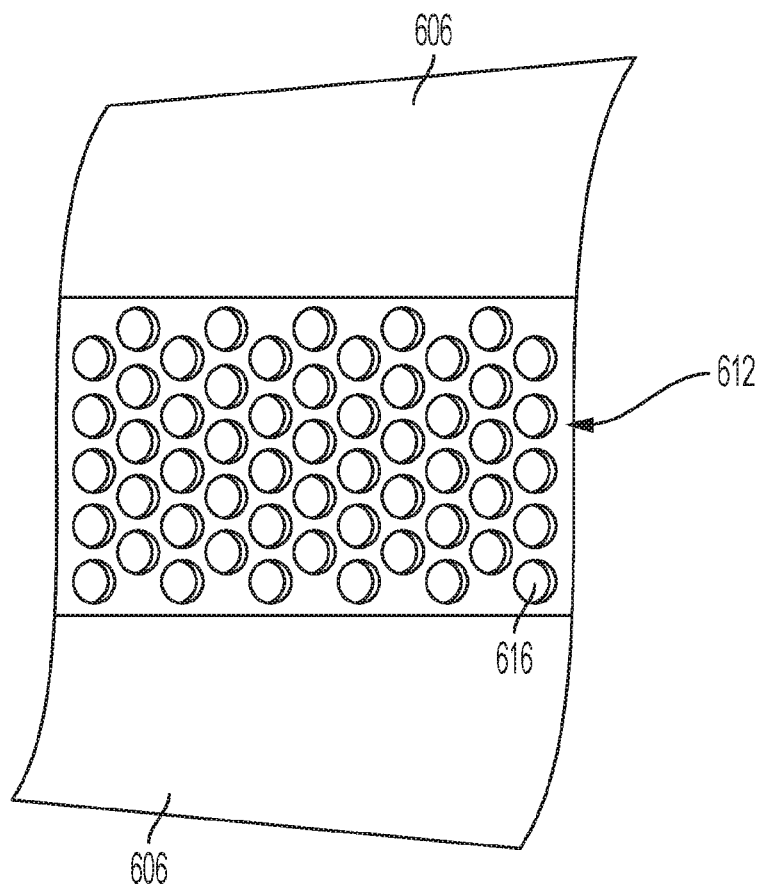
FIG. 34 illustrates a top view of a portion of the sorting and alignment system of FIG. 33.

Referring to FIG. 34, the side walls 606 of hopper 604 terminate at a width aligned with the outer edge of the arrangement of recesses 616 in plates 612. In embodiments, a length of hopper 604 is about 32 inches.

Returning to FIG. 33, an upper portion of hopper 604 includes a rotating brush 620 which rotates in direction 622. Brush 620 assists in the arrangement of cores 160 in individual recesses 616 of carrier 612.

In embodiments, lane dividers are provided in the bottom of the hopper 604 and produce apertures through which the individual cores 160 pass to enter the recesses 616 of carrier 612. Depending on the arrangement of recesses 616 of carrier 612, it may be necessary to run carrier 612 through multiple hoppers 604, each hopper 604 having lane dividers aligned with different rows of recesses 616 in carrier 612. In embodiments, recesses 616 of carrier 612 may be elongated along direction 614 to aid in receiving cores 160.

In embodiments, a top portion of conveyor 610 is positioned proximate to carrier 504 to transfer the cores 160 from carrier 612 to carrier 504. In other embodiments, carrier 612, once filled, is transitioned to a horizontal conveyor section for transfer of cores 160 to carrier 504.

Figure 35:
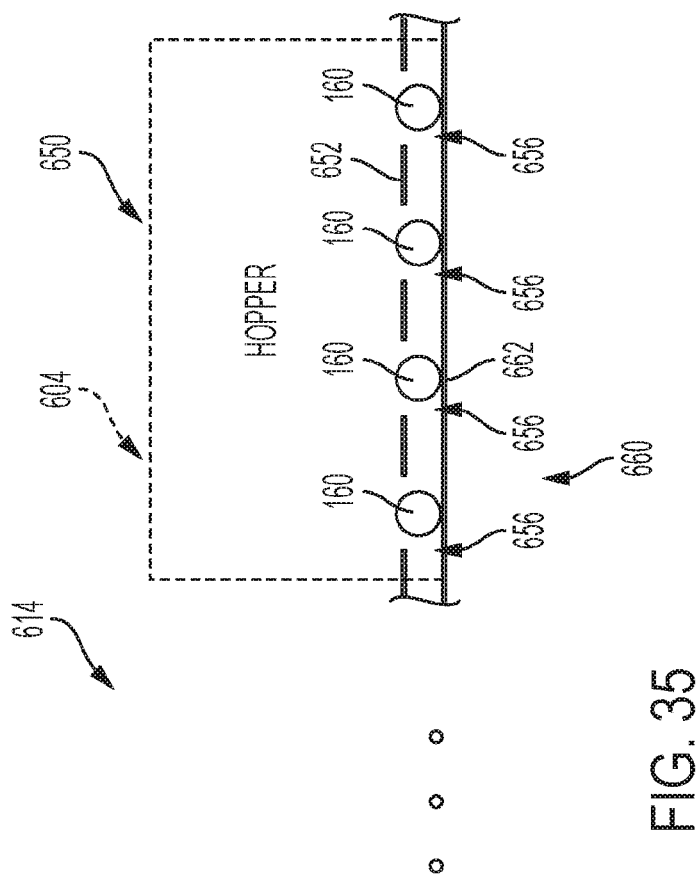
FIG. 35 illustrates a representative view of a portion of another exemplary sorting and alignment system.
Figure 35:
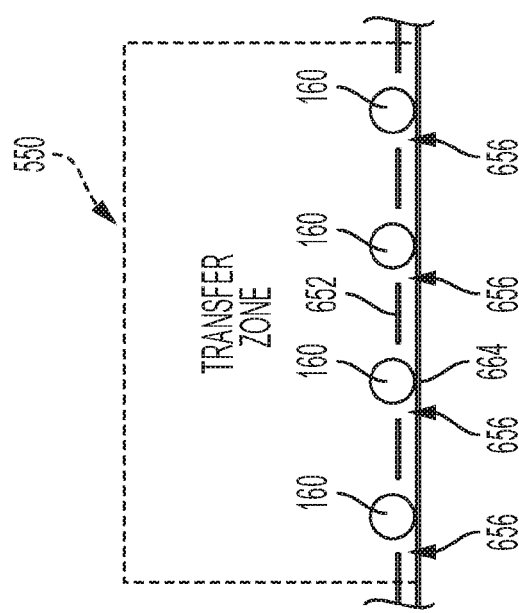

Referring to FIG. 35, an exemplary conveyor system 650 having a plurality of plates 652 (two marked) moveable in direction 614 is shown. Cores 160 are received in apertures 656 of plates 652 when a respective plate 652 is positioned below hopper 604. In embodiments, apertures 656 of plates 652 are elongated along direction 614 to aid in receiving cores 160.

Cores 160 rest on a support 660 which is positioned below plates 652. Support 660 has a first portion 662 positioned below hopper 604 with a first separation from plates 652 when plates 652 move overtop of portion 662 of support 660. Support 660 further has a second portion 664 positioned below the transfer zone 550 of carrier 504 with a second separation from plates 652 when plates 652 move overtop of portion 664 of support 660. First portion 662 of support 660 is connected to second portion 664 of support 660 through a third, transition portion (not shown) that changes the separation between support 660 and plates 652 from the first separation to the second separation. In embodiments, the transition portion has a ramp profile from the first portion 662 to the second portion.

As illustrated in FIG. 35, the first separation is larger than the second separation. In embodiments, the first separation is at least one half of the average height of cores 160 and up to the average height of cores 160. An advantage, among others, for this separation distance is to permit cores 160 to be retained in apertures 656 as the cores slide past the cores remaining in hopper 604 above plate 652. In embodiments, the second separation is less than one half of the average height of cores 160 which results in cores 160 protruding above an upper surface of plates 652. An advantage, among others, for this separation distance is to permit cores to be more easily transferred to carrier 504 with the aid of a vacuum source.

Figure 36:
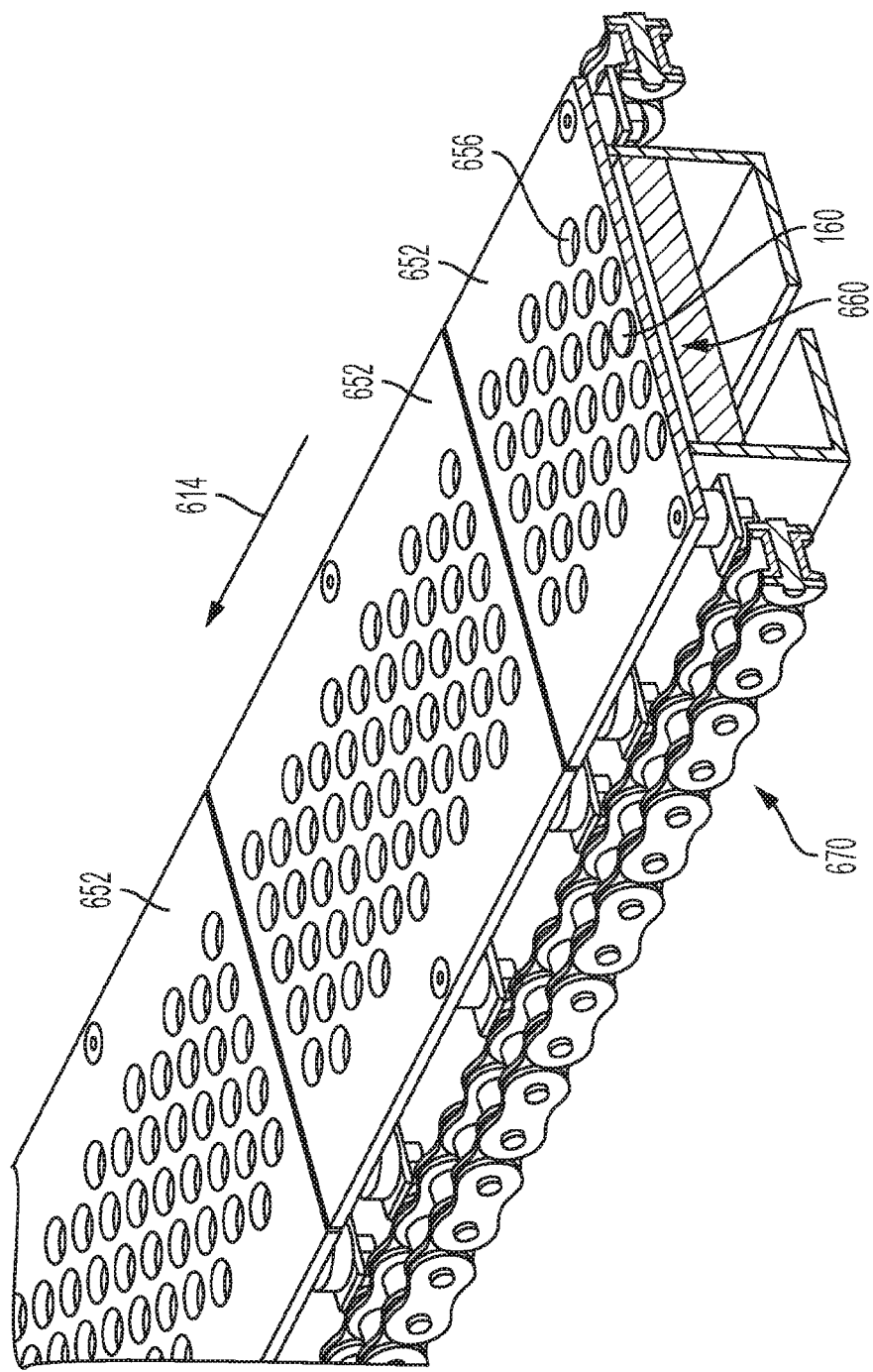
FIG. 36 illustrates a partial perspective view of an exemplary conveyor of a sorting and alignment system operating in accordance with FIG. 35.
Figure 37:
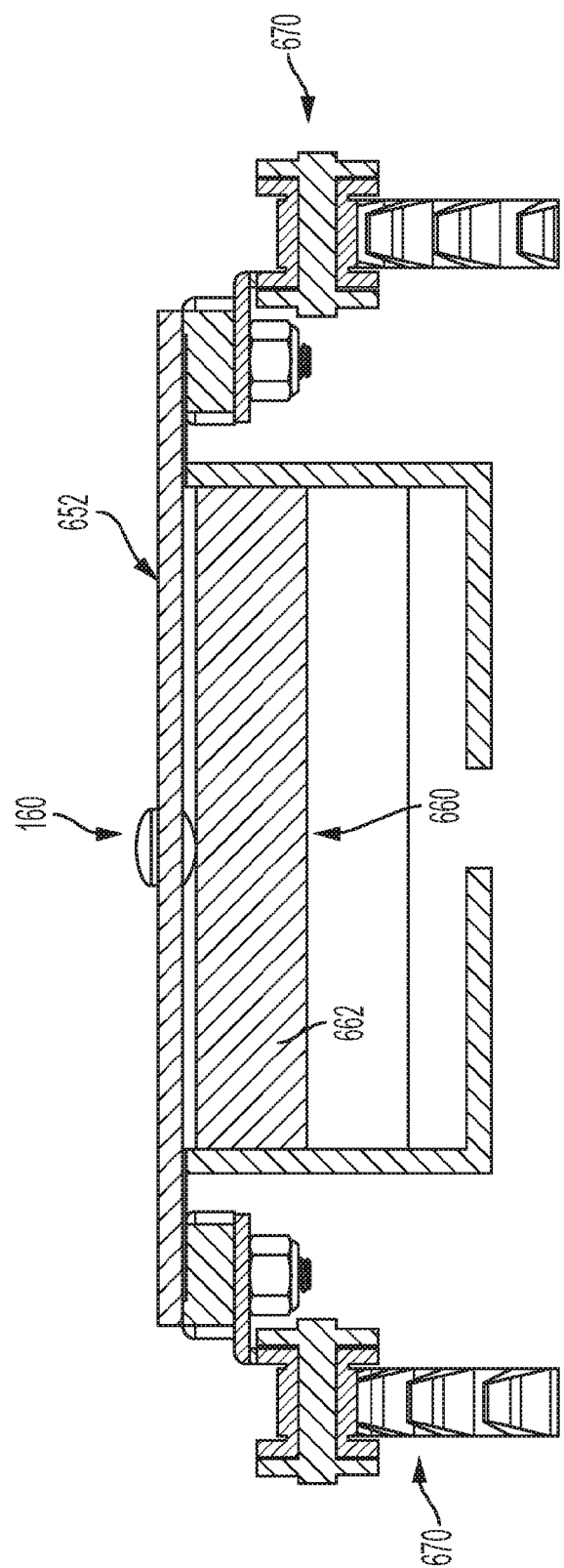
FIG. 37 illustrates an end view of the exemplary conveyor of FIG. 36.

Referring to FIGS. 36 and 37, an exemplary embodiment of a portion of conveyor system 650 is shown. First portion 662 of support 660 is received under plates 652. Support 660 remains stationary and plates 652 are pulled in direction 614 through a chain drive system 670 which is coupled to plates 652.

Figure 38:
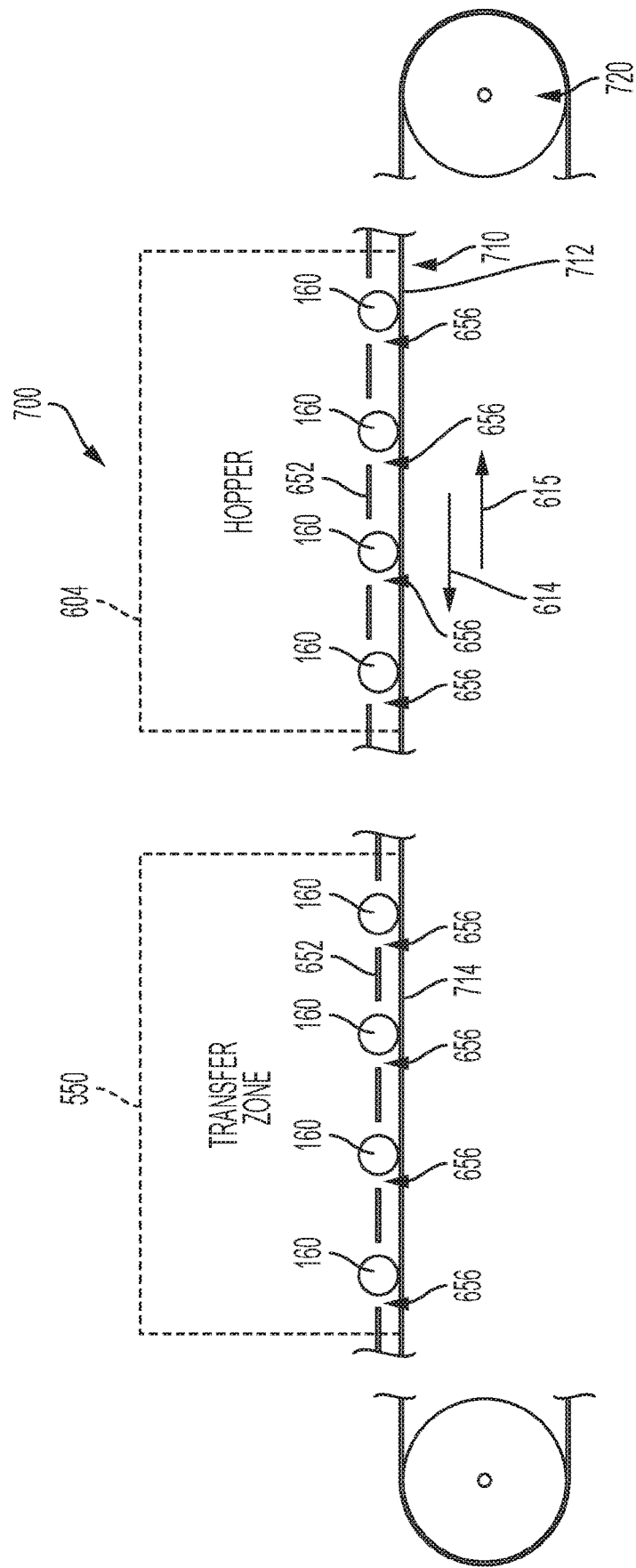
FIG. 38 illustrates a representative view of a portion of yet another exemplary sorting and alignment system.

Referring to FIG. 38, an exemplary conveyor system 700 having a plurality of plates 652 (two marked) moveable in direction 614. Cores 160 are received in apertures 656 of plates 652 when a respective plate 652 is positioned below hopper 604. In embodiments, apertures 656 of plates 652 are elongated along direction 614 to aid in receiving cores 160.

Cores 160 rest on a support 710 which is positioned below plates 652. Support 710 has a first portion 712 positioned below hopper 604 with a first separation from plates 652 when plates 652 move overtop of portion 712 of support 710. Support 710 further has a second portion 714 positioned below the transfer zone 550 of carrier 504 with a second separation from plates 652 when plates 652 move overtop of portion 714 of support 710. First portion 712 of support 710 is connected to second portion 714 of support 710 through a third, transition portion (not shown) that changes the separation between support 660 and plates 652 from the first separation to the second separation. In embodiments, the transition portion has a ramp profile from the first portion 662 to the second portion.

Support 710 is a moveable support, such as a belt, which is moved by a drive wheel 720. In embodiments, support 710 moves in direction 614, but at one of a higher or lower speed than the movement of plates 652 in direction 614. An advantage, among others, of running support 710 at a higher or lower speed than plates 652 is that cores 160 may be jostled and positioned in apertures 656 against a wall of the apertures 656. A further advantage, among others, of running support 710 at a lower speed than plates 652 is that an incline of plates 652 relative to horizontal proximate transfer zone 550 may be reduced since the lower speed will continue to retard cores against a back edge of apertures 656. In other embodiments, support 710 moves in direction 615, opposite to direction 614.

In embodiments, support 710 is smooth. In other embodiments, support 710 is textured.

As illustrated in FIG. 38, the first separation is larger than the second separation. In embodiments, the first separation is at least one half of the average height of cores 160 and up to the average height of cores 160. An advantage, among others, for this separation distance is to permit cores 160 to be retained in apertures 656 as the cores slide past the cores remaining in hopper 604 above plate 652. In embodiments, the second separation is less than one half of the average height of cores 160 which results in cores 160 protruding above an upper surface of plates 652. An advantage, among others, for this separation distance is to permit cores to be more easily transferred to carrier 504 with the aid of a vacuum source.

Figure 39:
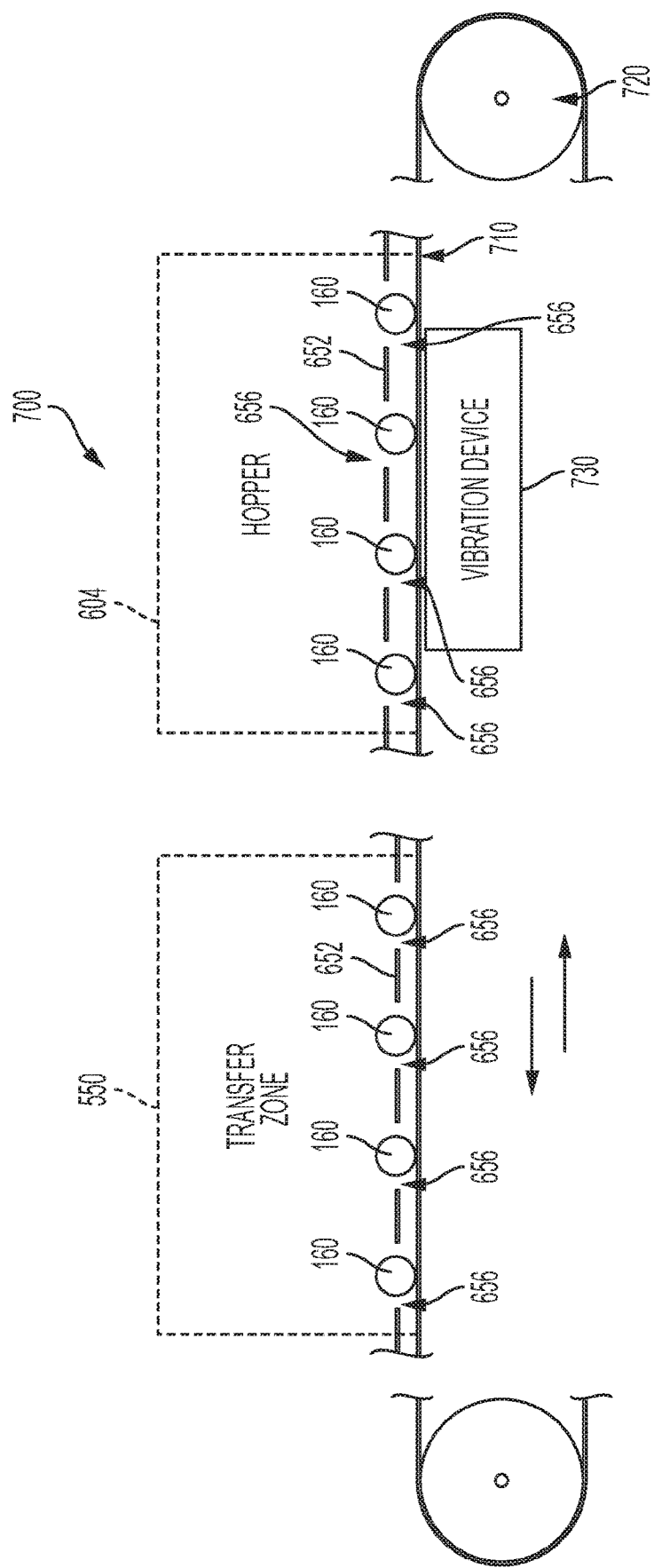
FIG. 39 illustrates a representative view of a portion of still another exemplary sorting and alignment system.

Referring to FIG. 39 an alternative embodiment of conveyor system 700' includes a vibration device 730 to vibrate support 710. An advantage, among others, of vibrating support 710 is to aide in the alignment of cores, particularly table shaped cores 160. Exemplary vibration devices include pneumatic and electrical industrial vibrators.

Referring to FIGS. 40-44, portions of another exemplary conveyor system 800 are shown. Conveyor system 800 includes a carrier 801, illustratively a plurality of plates, moveable in direction 820 towards a core lifter 802. In various embodiments, carrier 801 may be a continuous member such as a belt or one continuous plate. Cores 161 (two shown) are received in recesses 810 of carrier 801 when a respective portion of carrier 801 is positioned below hopper 604. In the illustrated embodiment, recesses 810 of carrier 801 are elongated along direction 820 to aid in receiving cores 161. Each of recesses 810 includes a plurality of supports 812 which support a respective core 161 and an aperture 814 which permits core lifter 802 to interact with cores 161. In various embodiments, the width of aperture 814 is less than that of cores 161 and recesses 810 such that cores 161 remain within recess 810 without additional support.

Figure 41B:
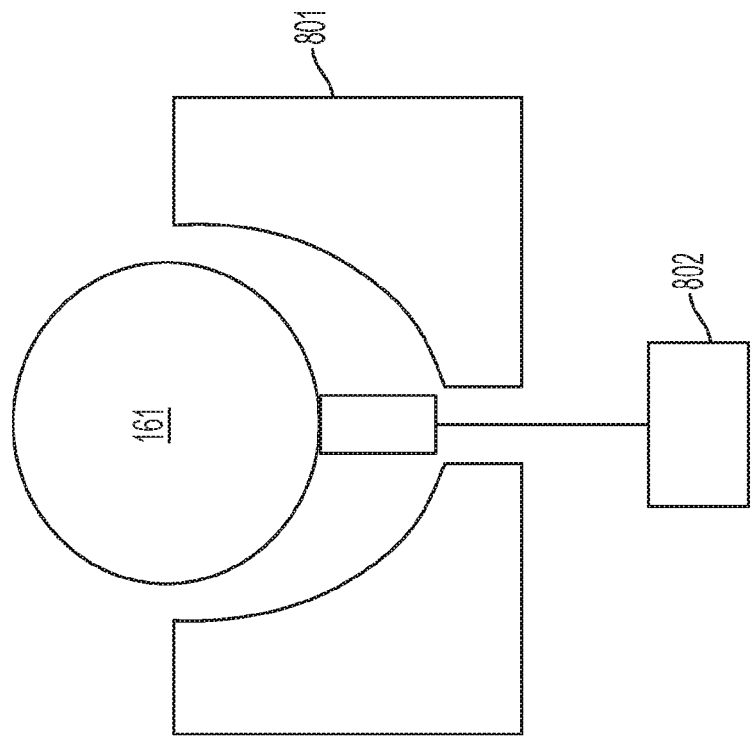
FIG. 41B illustrates a sectional view of the exemplary core lifter of FIG. 41A in a raised position.
Figure 41A:
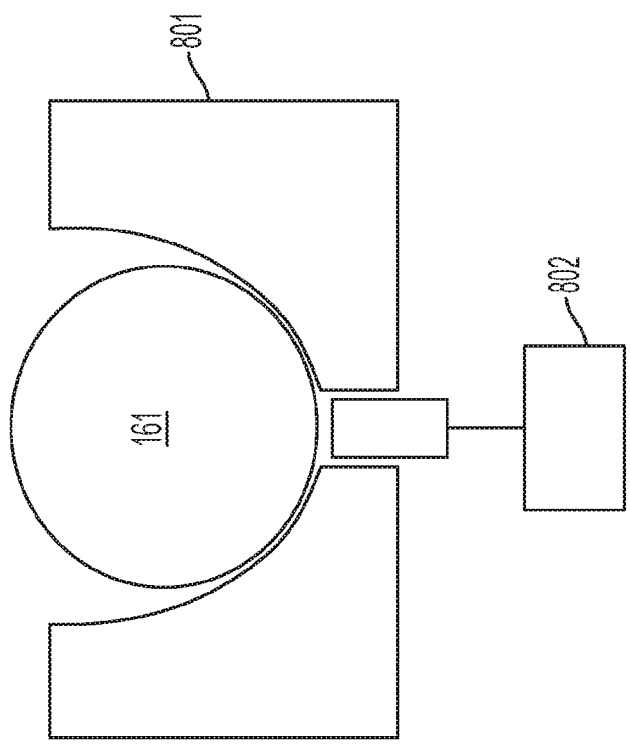
FIG. 41A illustrates a sectional view of an exemplary core lifter of the sorting and alignment system of FIG. 40 in a lowered position.

In various embodiments, core lifter 802 may include a stationary or moveable member configured to raise the cores 161 within recesses 810. Referring to FIGS. 41A and B, an exemplary core lifter 802 includes an actuator configured to raise the core, where when in a lowered position the core is supported by support 812. In various embodiments, core lifter 802 may lift cores 161 relative to carrier 801 by lifting support 812.

Figure 40:
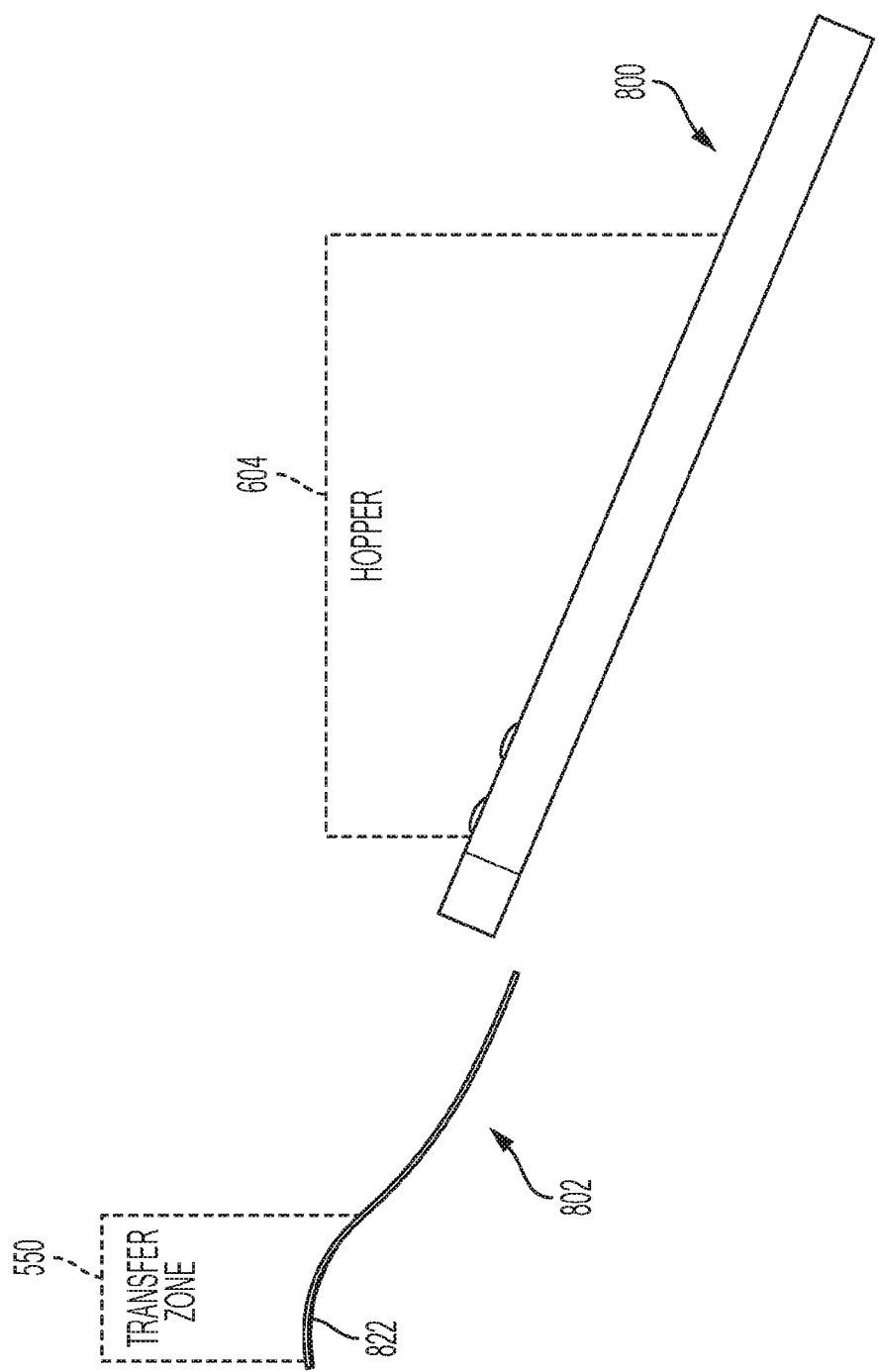
FIG. 40 illustrates a representative view of a portion of yet still another exemplary sorting and alignment system.
Figure 42:
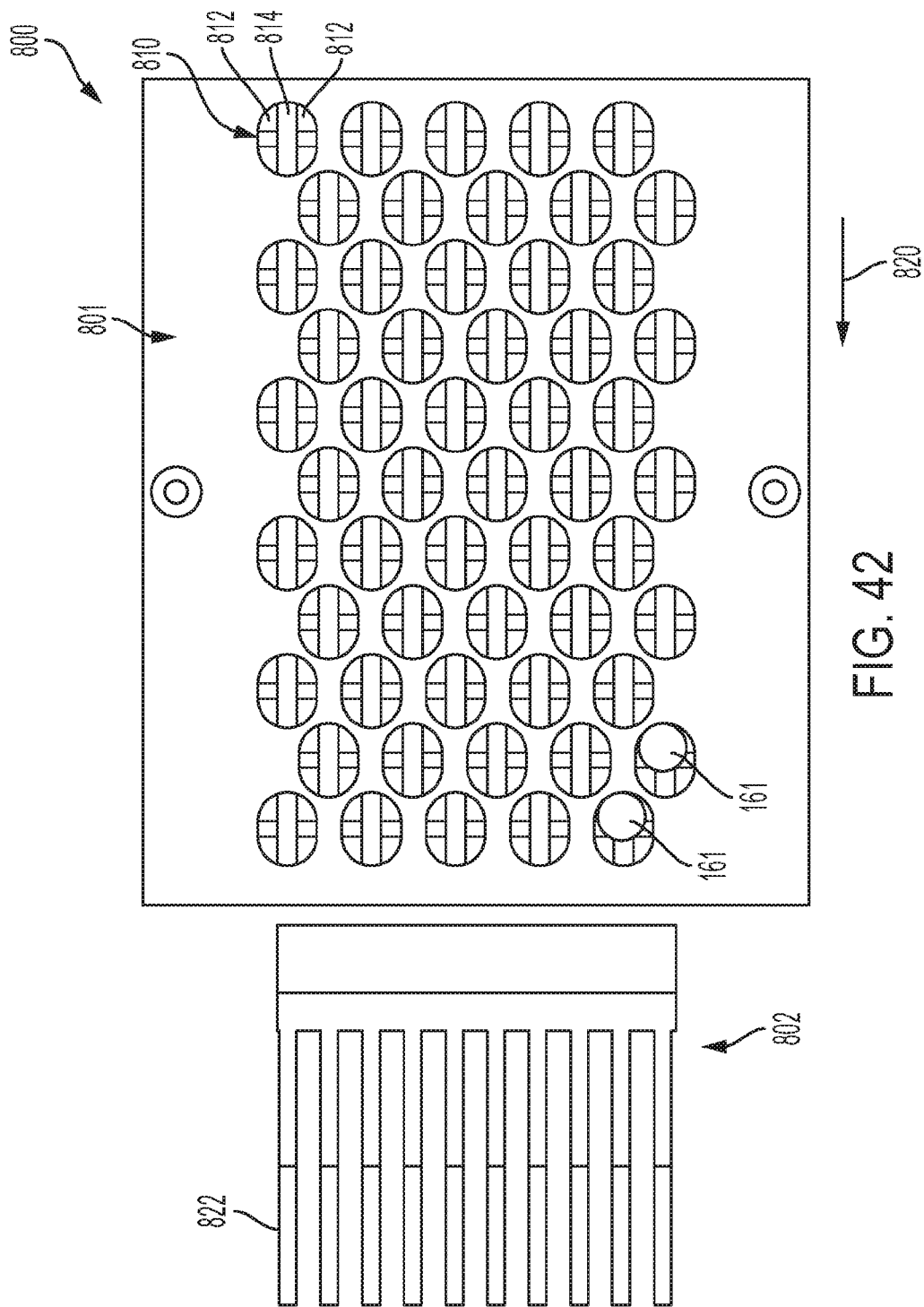
FIG. 42 illustrates a top view of a portion of the sorting and alignment system of FIG. 40.

Referring to FIG. 42, another exemplary core lifter 802 includes a plurality of fingers 822 (one marked) which are aligned with the apertures 814 in recesses 810. As shown in FIG. 40, fingers 822 are positioned below the transfer zone 550 of carrier 504 and have a profile that will raise cores 161 relative to carrier 801. In various embodiments, fingers 822 may be stationary, while in other various embodiments, fingers 822 may be moveable. Other examples of core lifter 802 include a rotating roller with raised portions to lift the cores 161 or a continuous belt with spaced apart raised areas to raise cores 161 up in recesses 810 when pulled the belt is pulled through.

Figure 43:
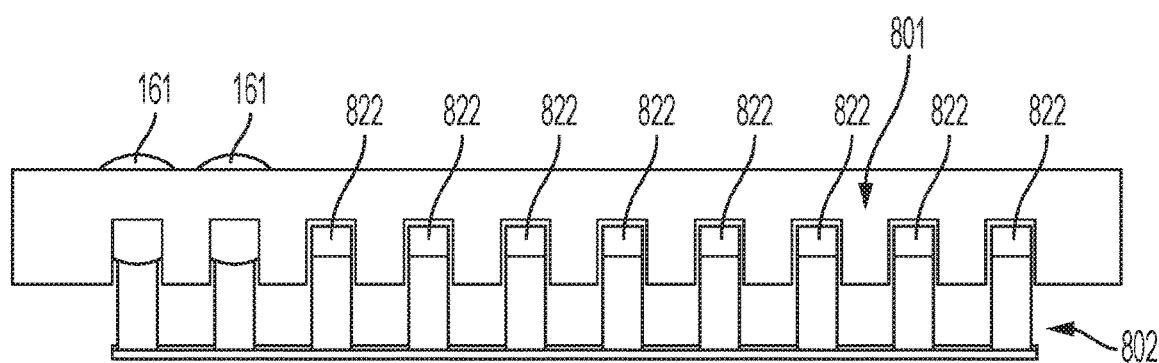
FIG. 43 illustrates an end view of the portion of the sorting and alignment system.
Figure 44:
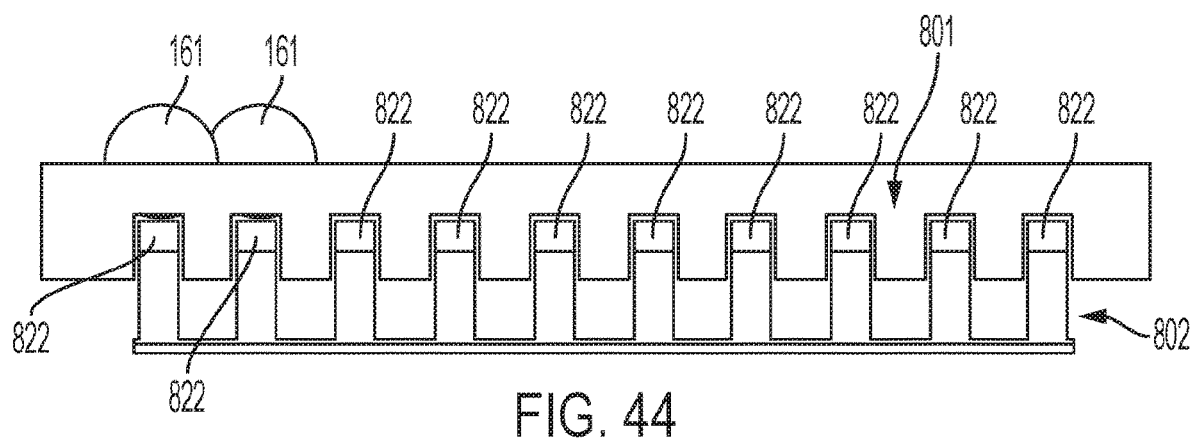
FIG. 44 illustrates an end view of the portion of the sorting and alignment system of FIG. 43 with raised cores.

Referring to FIG. 43, cores 161 are received in recesses 810 of carrier 801 when fingers 822 are not positioned below the recesses 810 having the illustrated cores 161. In embodiments, cores 161 are about 90 percent received in the respective recesses 810 such that only about 10 percent of the core 161 is above an upper surface of carrier 801. Referring to FIG. 44, when fingers 822 are positioned below the recesses 810 having cores 161, the fingers 822 press upward on cores 161 and raise cores 161 relative to carrier 801. In embodiments, cores 161 are raised to a position wherein about half of the core 161 is received by recess 810.

The carriers disclosed herein may be used to coat a plurality of agricultural cores with a flexible film. In an exemplary embodiment, a method of simultaneously coating a plurality of agricultural cores with a flexible film is provided. The method including supporting a first integer number of the plurality of agricultural cores on a first carrier having an exterior face including a connecting structure and a second number of core supports recessed relative to the connecting structure. Each core support including a pedestal sized and shaped to support one of the agricultural cores to be coated and a plurality of bridges which extend between the pedestal and the connecting structure of the exterior face. The second integer number being greater than the first integer number. The method further including positioning a flexible film over the first integer number of agricultural cores and coating an upper portion of each of the first integer number of agricultural cores with a first number of pieces of the flexible film broken off of the overall flexible sheet film. The method further including conforming a remainder of the flexible sheet film to the pedestal and plurality of bridges of a third integer number of core supports of the carrier such that the flexible sheet conformed to the third number of core supports is removed with the remainder the overall flexible film positioned over the connecting structure. The third integer number being equal to the first integer number subtracted from the second integer number. For example, if the carrier included 20 core supports and 20 cores were present then the third integer number would be zero. In another example, if the carrier included 20 core supports and 15 cores were present then the third integer number would be 5.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A system for coating agricultural cores with a flexible film, the system comprising:
   a carrier having an exterior face including a connecting structure and a plurality of core supports recessed relative to the connecting structure, each core support including
      a pedestal sized and shaped to support one of the agricultural cores to be coated, the pedestal including an aperture of a first fluid conduit; and
      a plurality of bridges which extend between the pedestal and the connecting structure of the exterior face of the carrier, the plurality of bridges being separated by a plurality of apertures of a second fluid conduit; and
   a vacuum system in fluid communication with the first fluid conduit and the second fluid conduit, wherein the vacuum system pulls the flexible film toward the pedestal.

2. The system of claim 1, wherein the plurality of bridges connect the connecting structure and the pedestal such that when an agricultural core is not positioned on the pedestal the flexible film is capable of conforming to the shape of the pedestal, the plurality of bridges, and the connecting structure.

3. The system of claim 1, wherein a top surface of the pedestal is below a top surface of the connecting structure.

4. The system of claim 3, wherein each of the plurality of bridges has a top surface extending above the top surface of the connecting structure.

5. The system of claim 3, wherein each of the plurality of bridges has a top surface positioned completely lower than the top surface of the connecting structure.

6. The system of claim 3, wherein each of the plurality of bridges has a top surface extending above the top surface of the pedestal.

7. The system of claim 3, wherein each of the plurality of bridges has a top surface positioned completely below the top surface of the pedestal.

8. The system of claim 3, wherein the pedestal includes a concave section surrounded by an outer shelf, the concave section including the aperture of the first fluid conduit.

9. The system of claim 1, wherein the carrier includes a base having a plurality of recesses and a plurality of inserts, each of the plurality of inserts being positioned in a respective one of the plurality of recesses, each of the plurality of inserts including the pedestal and bridges of the respective core supports.

10. The system of claim 1, wherein the flexible film is a biodegradable film.

11. The system of claim 1, wherein system further comprises a plurality of elongated film securing apertures.

12. A system for coating agricultural cores with a flexible film, the system comprising: a carrier having an exterior face including a connecting structure and a plurality of core supports recessed relative to the connecting structure, each core support including
   a central region to support the respective agricultural core, the central region including an aperture of a first fluid conduit; and
   a core periphery region surrounding the respective agricultural core, the core periphery region including a plurality of apertures of a second fluid conduit; and
   a vacuum system in fluid communication with the first fluid conduit and the second fluid conduit, for a respective core support the vacuum system controls an application of a partial vacuum to the first fluid conduit independent of an application of a partial vacuum to the second fluid conduit.

13. The system of claim 12, wherein the vacuum system permits the application of the partial vacuum to the second fluid conduit to stretch and break the flexible film.

14. The system of claim 12, wherein the vacuum system permits the application of the partial vacuum to the first fluid conduit when the respective core support is positioned to receive an agricultural core.

15. The system of claim 12, wherein the flexible film is secured to a film support by a plurality of elongated film securing apertures.

16. A system for coating agricultural cores with a flexible film, the system comprising:
   a carrier having a plurality of core supports connected by a connecting structure, a first film support positioned along a first side of the connecting structure, and a second film support positioned along a second side of the connecting structure, opposite the first side of the connecting structure, the first film support and the second film support including a plurality of elongated film securing apertures; and
   a vacuum system in fluid communication with the plurality of elongated film securing apertures in the first film support and the second film support, the vacuum system controls an application of a partial vacuum to the plurality of elongated film securing apertures to hold the flexible film relative to the carrier.

17. The system of claim 16, wherein each core support includes a central region to support the respective agricultural core, the central region including an aperture of a first fluid conduit, wherein the vacuum system controls an application of a partial vacuum to the first fluid conduit independent of the application of the partial vacuum to the plurality of elongated apertures in the first film support and the second film support.

18. The system of claim 16, wherein each core support further includes a core periphery region surrounding the central region, the core periphery region including a plurality of apertures of a second fluid conduit, wherein the vacuum system controls an application of a partial vacuum to the second fluid conduit independent of the application of the partial vacuum to the first fluid conduit.

* * * * *